United States Patent
Attarian et al.

(10) Patent No.: US 10,564,740 B2
(45) Date of Patent: Feb. 18, 2020

(54) PEN DEVICE—PANEL INTERACTION BASED ON ELECTROMAGNETIC SIGNALS OUTPUT BY THE PEN DEVICE

(71) Applicant: Samsung Electronics Co., Ltd., Gyeonggi-Do (KR)

(72) Inventors: Vatche A. Attarian, San Jose, CA (US); Olivier Bau, San Francisco, CA (US); Mike Digman, Mountain View, CA (US); Sajid Sadi, San Jose, CA (US); Sajjad Rahaman, Sunnyvale, CA (US)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 70 days.

(21) Appl. No.: 15/655,759

(22) Filed: Jul. 20, 2017

(65) Prior Publication Data
US 2018/0024653 A1 Jan. 25, 2018

Related U.S. Application Data

(60) Provisional application No. 62/365,328, filed on Jul. 21, 2016.

(51) Int. Cl.
*G06F 3/0354* (2013.01)
*G06F 3/038* (2013.01)
(Continued)

(52) U.S. Cl.
CPC ........ *G06F 3/0383* (2013.01); *G06F 3/03545* (2013.01); *G06F 3/046* (2013.01); *G06F 3/0416* (2013.01); *G06F 2203/04108* (2013.01)

(58) Field of Classification Search
CPC .......................... G06F 3/03545–03546; G06F 2203/041–04113; G06F 3/041–0428; G06F 1/1643; G06F 1/169–1698
See application file for complete search history.

(56) References Cited

U.S. PATENT DOCUMENTS 5,923,320 A * 7/1999 Murakami .............. G06F 3/044
345/173
8,884,876 B2   11/2014 Song et al.
(Continued)

FOREIGN PATENT DOCUMENTS

| EP | 1454225 A1 | 9/2004 |
| EP | 2425317 B1 | 4/2014 |
| WO | 03046708 A1 | 6/2003 |

OTHER PUBLICATIONS

Eun, B., "AES vs. EMR: Active Pen Technology Explained," [online] Tabletpcreview.com, Nov. 15, 2016 [retrieved Jul. 20, 2017], retrieved from the Internet: <http://www.tabletpcreview.com/feature/active-pen-technology-explained-aes-vs-emr/>, 3 pg.
(Continued)

*Primary Examiner* — Sanghyuk Park
(74) *Attorney, Agent, or Firm* — Cuenot, Forsythe & Kim, LLC

(57) ABSTRACT

A user input on a panel can be realized by detecting, by the panel, at least a first electromagnetic signal output by a pen device and, responsive to detecting the first electromagnetic signal output by the pen device, initiating at least a first process of a plurality of processes based on detecting the first electromagnetic signal output by the pen device.

31 Claims, 17 Drawing Sheets

(51) Int. Cl.
   *G06F 3/046* (2006.01)
   *G06F 3/041* (2006.01)

(56) References Cited

U.S. PATENT DOCUMENTS

| | | |
|---|---|---|
| 9,157,984 B2 | 10/2015 | Miyamoto et al. |
| 9,201,522 B2 | 12/2015 | Li |
| 9,207,813 B2 | 12/2015 | Blake et al. |
| 9,411,440 B2 | 8/2016 | Avanzi |
| 2004/0095333 A1* | 5/2004 | Morag ............... G06F 3/03545 345/173 |
| 2011/0007036 A1 | 1/2011 | Cinqualbre et al. |
| 2011/0013001 A1 | 1/2011 | Craven-Bartle et al. |
| 2011/0199343 A1 | 8/2011 | Cinqualbre |
| 2013/0176221 A1 | 7/2013 | Lapstun et al. |
| 2014/0152620 A1* | 6/2014 | Perski ................. G06F 3/0418 345/174 |
| 2015/0177856 A1 | 6/2015 | Kajitani et al. |
| 2015/0370351 A1 | 12/2015 | Wu et al. |
| 2016/0099983 A1 | 4/2016 | Han et al. |
| 2016/0117829 A1 | 4/2016 | Yoon et al. |

OTHER PUBLICATIONS

Eun, B., "Active Pen Technology Explained: Wacom vs N-trig," [online] Tabletpcreview.com, Nov. 7, 2016 [retrieved Jul. 20, 2017], retrieved from the Internet: <http://www.tabletpcreview.com/feature/active-pen-technology-explained-wacom-n-trig/>, 3 pg.

* cited by examiner

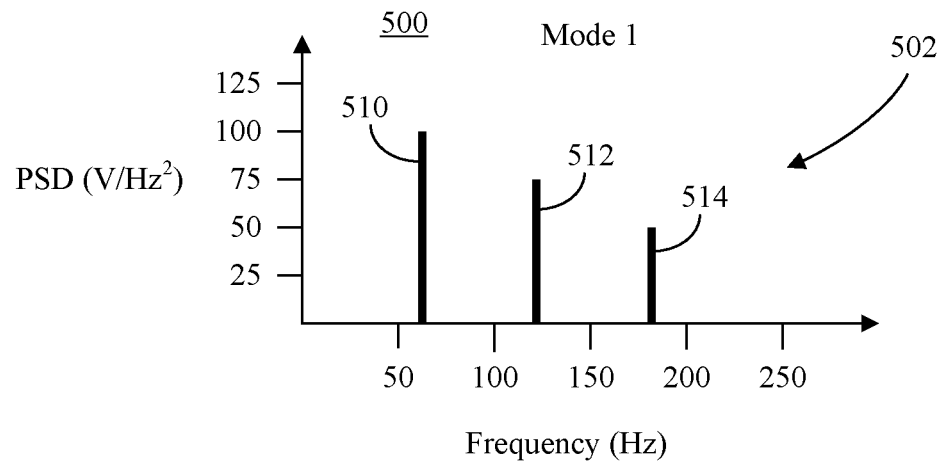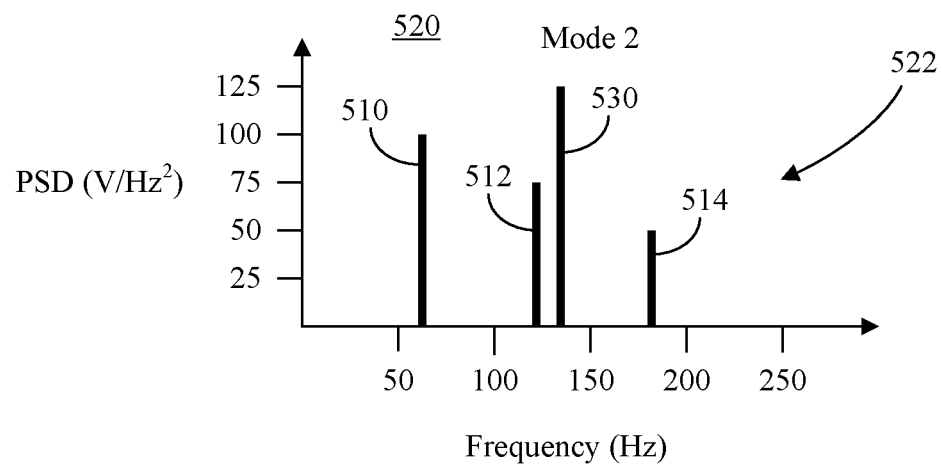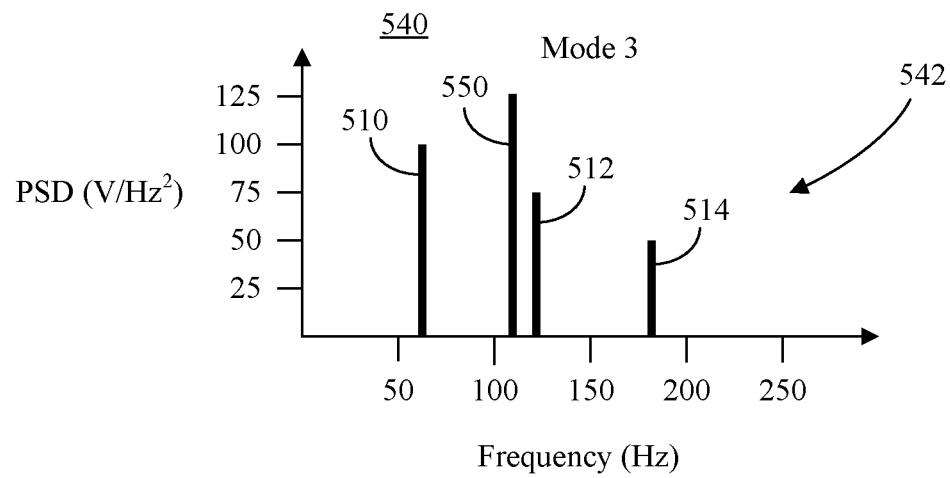
FIG. 5

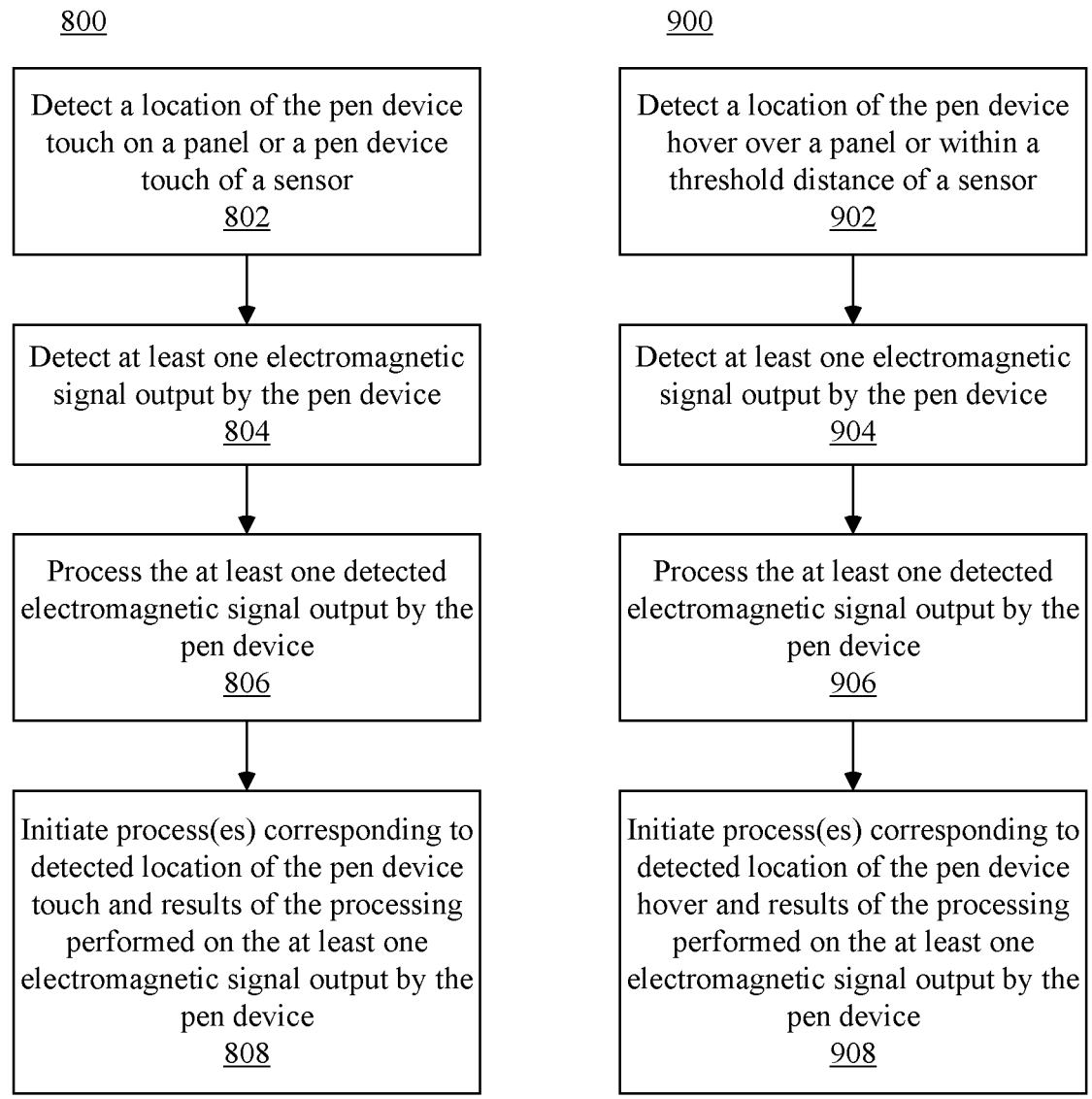

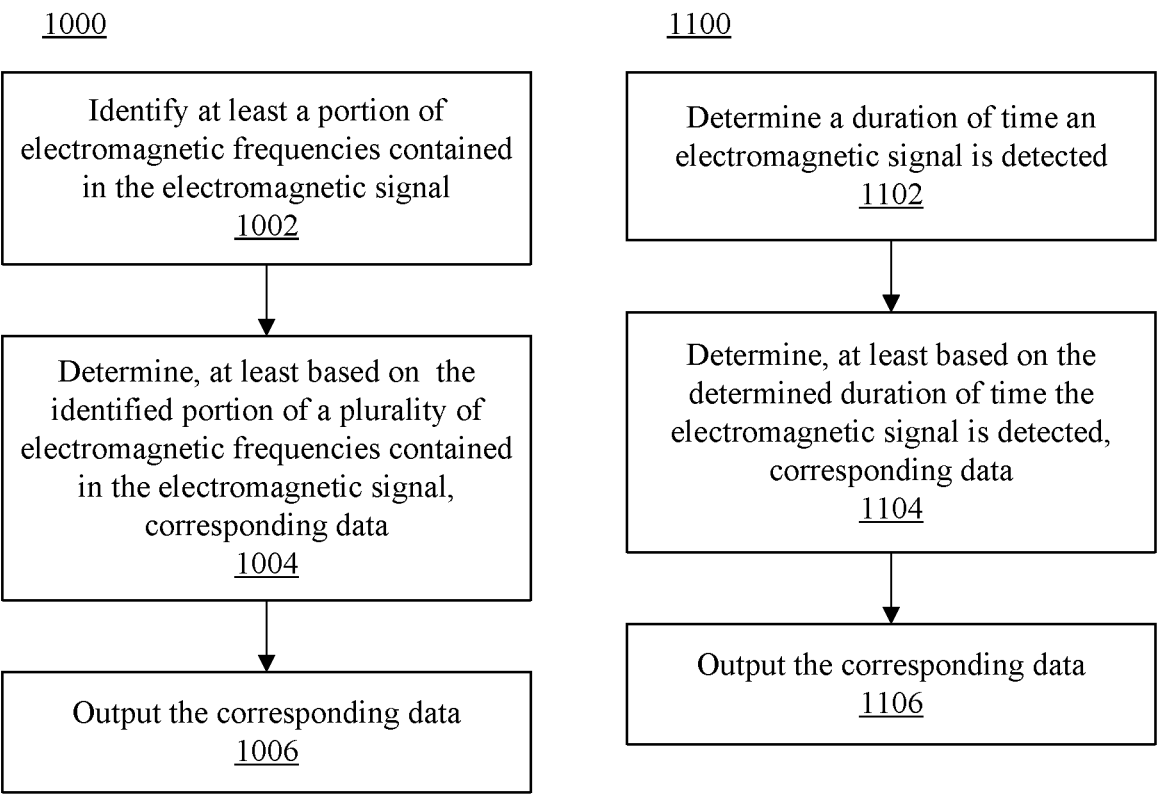

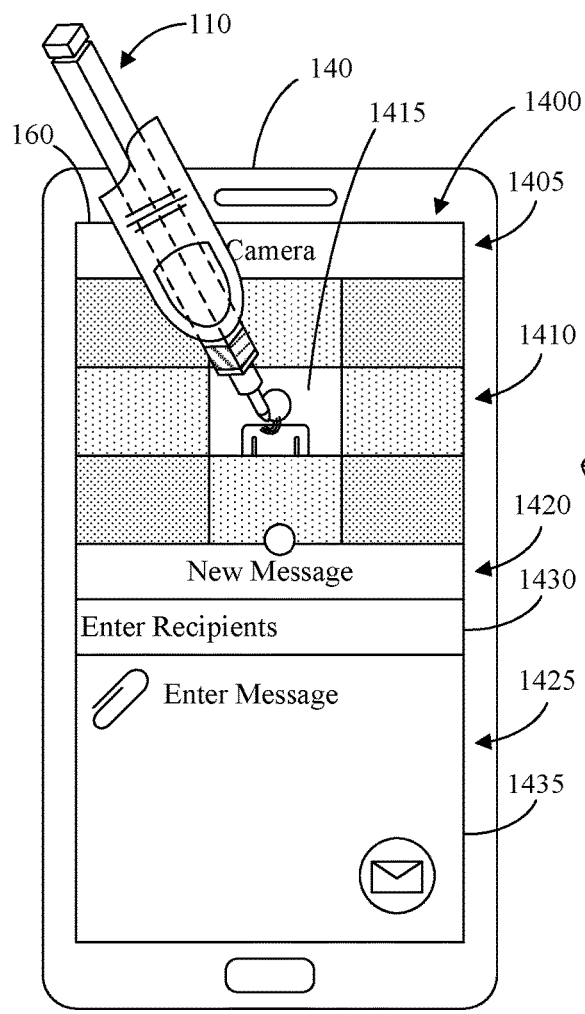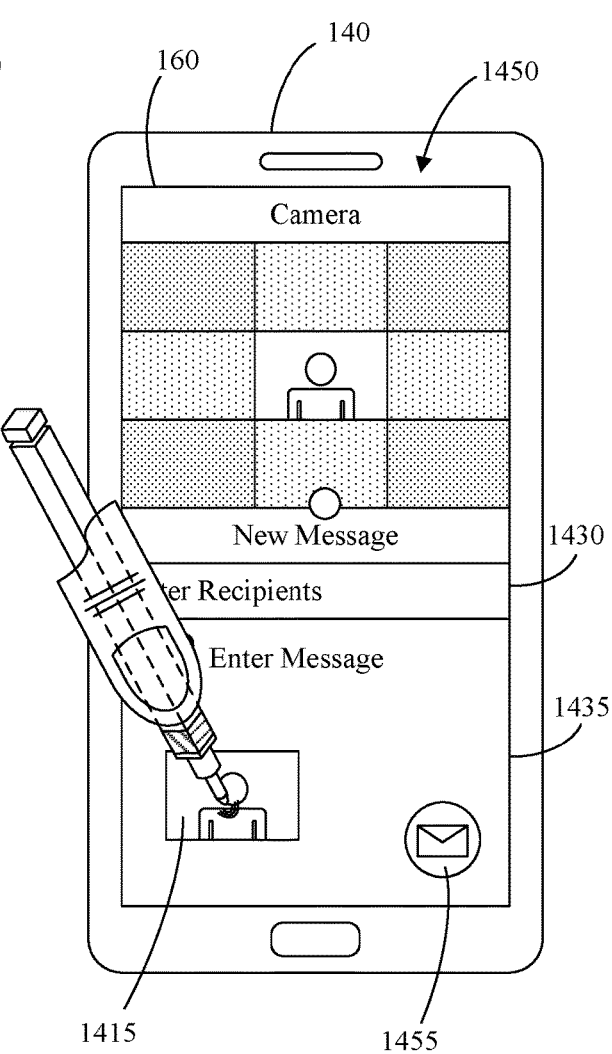
FIG. 14A  FIG. 14B

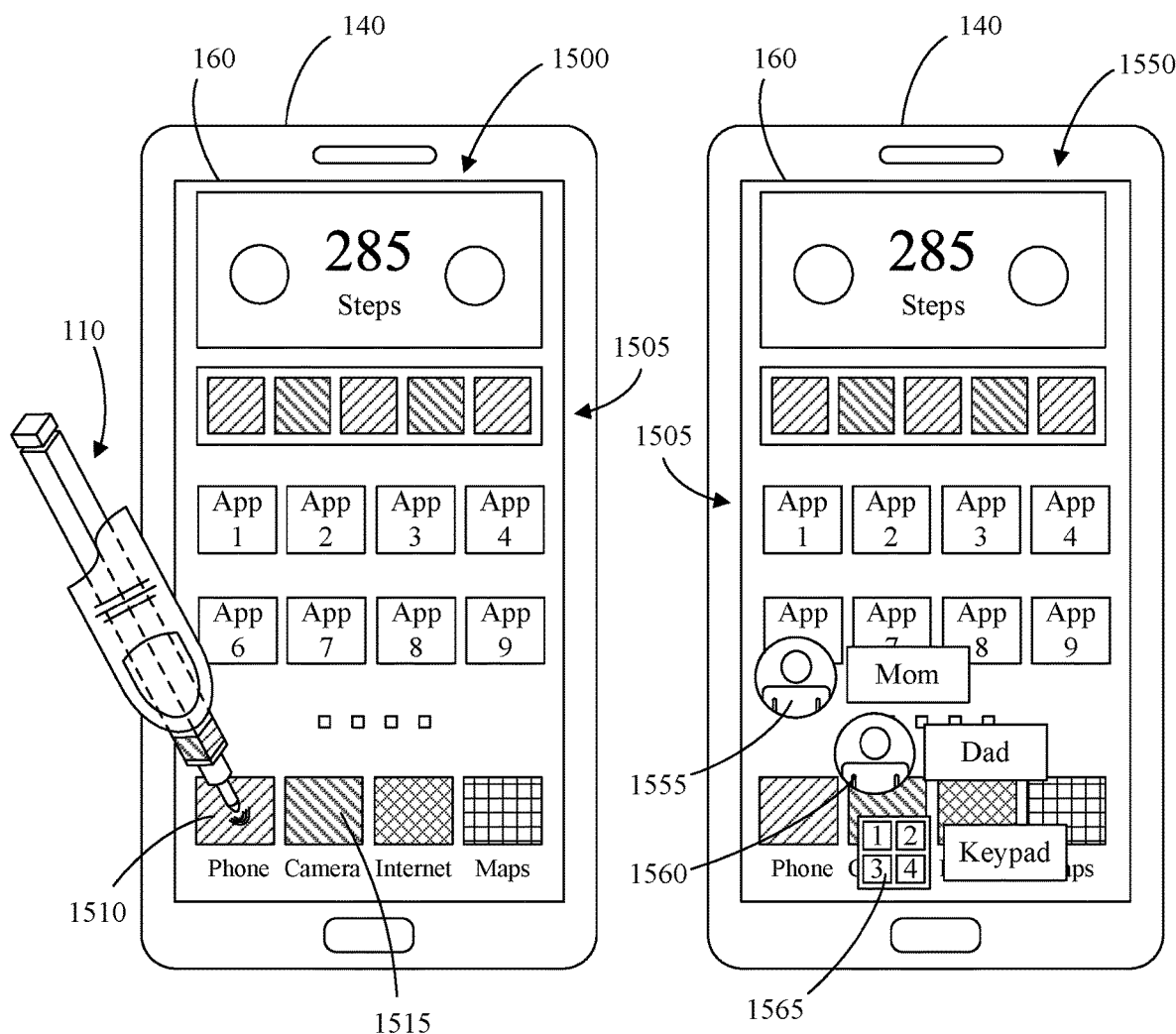
FIG. 15A  FIG. 15B

PEN DEVICE—PANEL INTERACTION BASED ON ELECTROMAGNETIC SIGNALS OUTPUT BY THE PEN DEVICE

CROSS-REFERENCE TO RELATED APPLICATIONS

This application claims the benefit of U.S. Application No. 62/365,328 filed on Jul. 21, 2016, which is fully incorporated herein by reference.

TECHNICAL FIELD

This disclosure relates to input devices used with data processing systems and, more particularly, to pen devices.

BACKGROUND

An active pen (also referred to as an active stylus or digital pen) is an input device, typically including electronic circuitry, which is configured to be held in a hand of a user and used by the user to enter user inputs directly onto a panel (e.g., a touchscreen or touchpad) of an electronic device, for example a smartphone or a computer. Although a passive stylus also can be used to write directly on a touchscreen surface, an active pen generally provides more features than a passive stylus. In this regard, a passive stylus typically does not include internal circuitry, and thus lacks certain features that are unique to an active pen.

SUMMARY

A method for realizing a user input on a panel can include detecting, by the panel, at least a first electromagnetic signal output by a pen device. The method also can include, responsive to detecting the first electromagnetic signal output by the pen device, initiating at least a first process of a plurality of processes based on detecting the first electromagnetic signal output by the pen device.

A method of outputting at least a first electromagnetic signal by a pen device can include outputting at least a first electromagnetic signal by the pen device, wherein detection of the first electromagnetic signal causes initiation of a first process of a plurality of processes at a device.

An apparatus can include a memory configured to store instructions and a processor coupled to the memory. The processor, in response to executing the instructions, is configured to initiate operations for realizing a user input on a panel. The operations can include detecting, by the panel, at least a first electromagnetic signal output by a pen device. The operations also can include, responsive to detecting the first electromagnetic signal output by the pen device, initiating at least a first process of a plurality of processes based on detecting the first electromagnetic signal output by the pen device.

A pen device can include at least component that outputs at least a first electromagnetic signal by the pen device, wherein detection of the first electromagnetic signal causes initiation of a first process of a plurality of processes at an apparatus.

A computer program product can include a computer readable storage medium having program code stored thereon for realizing a user input on a panel. The program code is executable by a processor to perform operations. The operations can include detecting, by the panel, at least a first electromagnetic signal output by a pen device. The operations also can include, responsive to detecting the first electromagnetic signal output by the pen device, initiating at least a first process of a plurality of processes based on detecting the first electromagnetic signal output by the pen device.

This Summary section is provided merely to introduce certain concepts and not to identify any key or essential features of the claimed subject matter. Many other features and arrangements of the invention will be apparent from the accompanying drawings and from the following detailed description.

BRIEF DESCRIPTION OF THE DRAWINGS

The accompanying drawings show one or more arrangements; however, the accompanying drawings should not be taken to limit the invention to only the arrangements shown. Various aspects and advantages will become apparent upon review of the following detailed description and upon reference to the drawings.

FIG. 5 is depicts graphs of example frequency spectrums of different electromagnetic signals output by a pen device.

FIG. 8 is flow chart illustrating an example of a method of initiating operations responsive to detecting a pen device touch by a panel or sensor of an electronic device.

FIG. 9 is flow chart illustrating an example of a method of initiating operations responsive to detecting a pen device hover by a panel or sensor of an electronic device.

FIG. 10 is flow chart illustrating an example of a method of generating data based on detected electromagnetic signals output by a pen device.

FIG. 11 is flow chart illustrating another example of a method of generating data based on detected electromagnetic signals output by a pen device.

FIGS. 14A and 14B depict views presented by a panel of an electronic device representing another example of a use case in accordance with the present arrangements.

FIGS. 15A and 15B depict views presented by a panel of an electronic device representing another example of a use case in accordance with the present arrangements.

DETAILED DESCRIPTION

Figure 1:
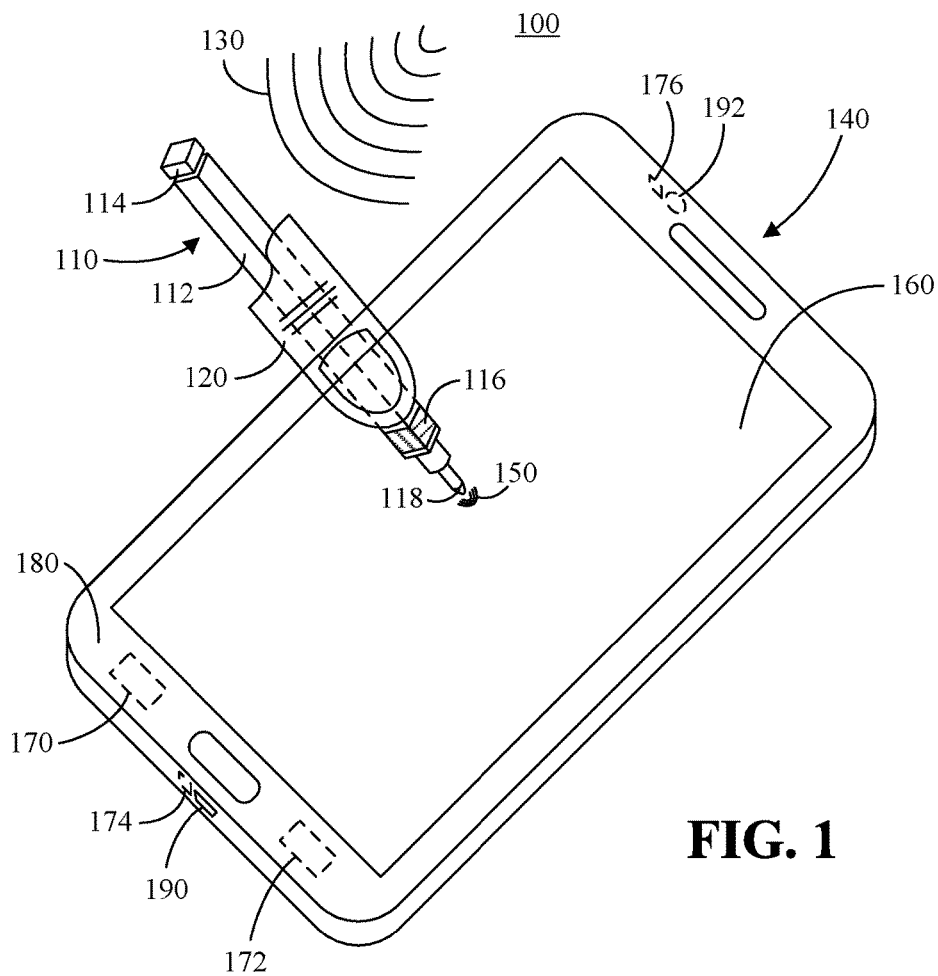
FIG. 1 is a diagram illustrating an example of a system including a pen device and an electronic device.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to improving input devices used with data processing systems and, more particularly, to pen devices. In accordance with the inventive arrangements disclosed herein, a panel, for example a touchscreen or touchpad of an electronic device, can detect at least one electromagnetic signal output by a pen device. For example, electrodes in a capacitive touchscreen or wires in a resistive touchscreen can detect the electromagnetic signals. A signal processor of the electronic device can process the detected electromagnetic signals, and output corresponding data to an application. The application can process the data and, in response, initiate one or more processes corresponding to the data, e.g., drawing lines, shapes, etc., erasing lines, shapes, etc., changing drawing colors, cutting objects, copying objects, pasting objects, altering between writing and navigation modes, etc.

The pen device can generate the electromagnetic signals using electromagnetic noise signals detected in an environment (e.g., coupling directing to the pen device or coupling to the pen device through a user using the pen device). Further, the pen device can generate the electromagnetic signals using an electronic circuit configured to generate electromagnetic signals. Whether the pen device uses the electromagnetic noise signals or the electronic circuit to generate the electromagnetic signals can depend on a mode in which the pen device is operating. The frequency spectrum of the electromagnetic signals output can be different in the different pen device operating modes. Accordingly, a user can change the operating mode to select the processes(s) to be initiated by the electronic device.

The present arrangements provide numerous advantages over existing pen device/stylus technologies. For example, the present arrangements provide novel ways to control the manner in which gestures with pen devices are interpreted, increase accuracy of position tracking of drawing, eliminate or simplify noise rejection for nib position recovery enhancement, and provide differentiation between touches with a pen device and touches with a user's appendage. Further, the present arrangements transmit information from a pen device directly to a panel. Moreover, the present arrangements allow the user to change operating modes via touch of one or more easily accessible electromechanical elements (e.g. buttons, sliders, joysticks, tactile sensors, etc.), rather than having to change operating modes in an application being used by the user. Interaction with various electromechanical elements results in changes in electromagnetic signal generation, thereby enabling an enriched user experience using the pen device. In illustration, if the user is using a drawing application, the user can change the color of lines drawn by the pen device, or change the pen device to erase mode, by depressing a button on the pen device. The user need not interface with an application user interface menu to change between the operating modes.

Further, the present arrangements do not require an integrated digitizer layer to register pen inputs. Thus, there is no need for additional hardware integration beyond the components described herein. Indeed, the present arrangements can be implemented using currently available panels (e.g., touch panels). The present arrangements also provide improved responsiveness to interactions with user interface elements since there is no need for interpreting reflection of driving signals. The present arrangements also are compatible with low power transduction methods.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a diagram illustrating an example of a system 100 including various apparatuses, including a pen device 110 and an electronic device 140. The pen device 110 can include case 112 (e.g., shell), a click member 114, a grip 116 and a nib 118, and an electronic circuitry (shown in FIG. 3) encased within the pen device 110. The pen device 110 can be configured to be held by at least one appendage 120 of a user, for example a finger and one or more other fingers. A diameter of a tip of the nib 118 can be any suitable diameter, for example 0.5 mm, 0.75 mm, 1.0 mm, 1.5 mm, 2.0 mm, and so on.

In operation, the pen device 110 can detect one or more electromagnetic noise signals 130 external to the pen device 110. The electromagnetic noise signals 130 can be generated by any of a variety of electrical/electronic equipment and/or devices in an environment in which the pen device 110 is operated. In illustration, at least a portion of the electromagnetic noise signals 130 can be generated by an electronic device 140 with which the pen device 110 is being used, but the present arrangements are not limited in this regard. For instance, at least a portion of the electromagnetic noise signals 130 can be generated by electrical wiring, lights and/or other electrical/electronic equipment and/or devices in the environment. In this regard, anytime there is a flow of electricity, electromagnetic noise signals are generated. For example, a magnetic field, which is a form of an electromagnetic noise signal, is generated in the near field, as described by Ampere's Law. Electromagnetic radiation behaviors dominate at great distances (i.e., in the far field), however.

Regardless of whether the pen device 110 and/or user's body is within the near field or far field, the pen device 110 and/or user's body will receive the electromagnetic noise signals 130. The pen device 110 can detect electromagnetic noise signal(s) 130 directly from the noise signal sources and/or detect electromagnetic noise signal(s) 130 via the appendage(s) 120 of the user (e.g., finger) used to hold the pen device 110. For example, the user's body may provide a conduit for communicating electromagnetic noise signals 130 received by the user's body to the pen device 110. For example, in one arrangement, the case 112 of the pen device 110 can be made using an electrically conductive material, such as an electrically conductive metal/alloy or some other form of electrically conductive material, which detects electromagnetic noise signals 130. In another arrangement, the pen device 110 can include one or more antennas (not shown) configured to detect electromagnetic noise signals 130.

The pen device 110 can output at least one electromagnetic signal 150, as will be described in further detail, and communicate (e.g., transmit) the electromagnetic signal(s) 150 to a panel 160 configured to detect the electromagnetic signal(s) 150. The electromagnetic signal(s) 150 can be output using the detected electromagnetic noise signal(s) 130 and/or generated by electronic circuitry within the pen device 110, as will be described. The panel 160 can be, for example, a touch sensing panel, such as a touchscreen or touchpad of the electronic device 140. In illustration, the panel 160 can be a resistive touch display, a capacitive touch display, a NoiseTouch sensing panel, etc.

The electronic device 140 can be, for example, a smart phone, a computer (e.g., a workstation, a desktop computer, a laptop computer, a notebook computer, a mobile computer, a tablet computer, etc.), a gaming device, a television, a mobile display, a digital sign, a whiteboard, and so on. Responsive to sensing the electromagnetic signal(s) 150, the panel 160 can communicate the electromagnetic signal(s) 150 to a signal processor (shown in FIG. 6) of the electronic device 140. The signal processor can process the electromagnetic signal(s) 150 and generate corresponding data. The signal processor can communicate the data to a processor (shown in FIG. 6) of the electronic device 140. In addition to sensing the electromagnetic signal(s) 150, the electronic device 140 can be configured to track any physical token or tool on the panel 160. Examples of a physical token or tool include, but are not limited to, gaming input devices, multi-touch/tangible interfaces and multi-tool drawing components (e.g., eraser, pen, brush, etc.).

The pen device 110 can selectively output electromagnetic signal(s) 150 based on one or more user inputs received by the pen device 110. The user can enter user inputs by depressing the click member 114 one or more times, depressing one or buttons (not shown in FIG. 1) within the grip 116, holding the click button(s) depressed for a threshold period of time, depressing the nib 118 (e.g., by pressing the nib 118 against the panel 160), and so on. The pen device 110 can generate at least one electromagnetic signal 150 based on the user input, and output that electromagnetic signal 150. The electromagnetic signal 150 can include one or more electromagnetic frequencies, as will be described herein.

The processes implemented by the electronic device 140 can be selected by the electronic device 140 based on the electromagnetic signal(s) 150 that are sensed by the panel 160, a location of the nib 118 on or near the panel 160 and/or a movement of the nib 118 on or near the panel 160. In a further arrangement, processes implemented by the electronic device 140 can be selected by the electronic device 140 based on a location of the nib 118 on or near other regions of the electronic device 140.

In illustration, the electronic device 140 can include one or more sensors 170, 172, 174, 176, external to the panel 160, configured to detect the electromagnetic signal(s) 150 output by the pen device 110. For example, the sensors 170, 172 can be positioned within, or immediately behind, a surface 180 of the electronic device. The sensor 174 can be positioned within a threshold distance of a communications port 190 (e.g., a universal serial bus (USB) port). The sensor 176 can be positioned within a threshold distance of an audio port 192.

If the user positions the nib 118 proximate to (i.e., within a threshold distance of) the sensor 170, the sensor 170 can detect the electromagnetic signal(s) 150. The electronic device 140 can, based on the sensor 170 detecting the electromagnetic signal(s) 150 and, optionally, the frequency/frequencies of the electromagnetic signal(s) 150, initiate one or more processes specified to correspond to the sensor 170 detecting the electromagnetic signal(s) 150 and/or the detected frequency/frequencies. Similarly, if the user positions the nib 118 proximate to (i.e., within a threshold distance of) the sensor 172, sensor 174 or sensor 176, the sensor 172, 174, 176 can detect the electromagnetic signal(s) 150. The electronic device 140 can, based on the sensor 172, 174, 176 detecting the electromagnetic signal(s) 150, initiate one or more processes specified to correspond to the to the sensor 172, 174, 176 detecting the electromagnetic signal(s) 150.

In one aspect of the present arrangements, rather than including the sensor 174, the electronic device 140 can be configured to detect the electromagnetic signal(s) 150 coupling onto the communication port 190 when the nib 118 is positioned within a threshold distance of the communication port 190. The electronic device 140 can, based on the communication port 190 detecting the electromagnetic signal(s) 150, initiate one or more processes specified to correspond to the to the communication port 190 detecting the electromagnetic signal(s) 150. Similarly, rather than including the sensor 176, the electronic device 140 can be configured to detect the electromagnetic signal(s) 150 coupling onto the audio port 192 when the nib 118 is positioned within a threshold distance of the audio port 192. The electronic device 140 can, based on the audio port 192 detecting the electromagnetic signal(s) 150, initiate one or more processes specified to correspond to the to the audio port 192 detecting the electromagnetic signal(s) 150. In this regard, suitable electronic components can be communicatively linked to the communication port 190 and/or audio port 192 to process the electromagnetic signal(s) 150 coupling onto the communication port and/or audio port 192.

Various process implemented by the electronic device 140 based on detection of the electromagnetic signal(s) 150 can include, but are not limited to, mode switching of the pen device 110 (e.g., switching between writing mode and erase mode for interpretation of detected movements of the pen device 110, switching between colors assigned to detected movements of the pen device 110 in a drawing application (e.g., change from blue to red, etc.), and so on), electronic device 140 mode switching (e.g., open applications, close applications, switch between applications, etc.), copy operations, cut operations, paste operations, hover operations, access certain types of data (e.g., favorite contacts, recent callers, etc.), menu item selections, initiating shortcut operations, imitating application navigation operations, and so on.

Implementation of such processes can facilitate on the fly mode changes in applications for selection, sharing, changing stylus effects, enhance accuracy of position tracking through coupling of the electromagnetic signal for noise-Touch technology interpretation, seamless copying of content such as photos for easier sharing in messaging, browser, email and other explorer windows, expanding the user interface by adding a layer of depth for quick actions which are activated by electromagnetic noise signal detection (which is faster for the user than force touch while achieving similar affordances), minimizing components presented to the user using a hardware mechanical design in order to simplify the interface, affording multi-button experiences to allow integration of several user interface elements (e.g. buttons, sliders, joysticks, tactile sensors, etc.), and supporting various different interactions with various buttons of the pen device 110.

In one aspect of the present arrangements, the pen device 110 can sense one or more physical parameters, such as an ambient temperature and/or one or more electromagnetic field intensities, and the pen device 110 can determine the electromagnetic signals 150 based on the detected physical parameter(s) and/or variations in the detected physical parameter(s). In such an arrangement, the pen device 110 can include sensors (not shown) that detect such physical parameters. The electromagnetic signals 150 based on the detected physical parameter(s) and/or variations in the detected physical parameter(s) can be detected by the electronic device 140 and used for classification and rendering of preprogrammed effects, such as those effects that are described herein.

In one aspect of the present arrangements, the electronic device 140 can sense whether the nib 118 is in contact with the panel 160 or hovering over the panel 160, and initiate processes depending on whether the nib 118 is in contact with the panel 160 or hovering over the panel 160. In illustration, the electronic device 140 can trigger a touch controller (630 of FIG. 6) of the electronic device 140 to negate appendage touches by the user on the panel 160 in response to detecting the nib 118 in contact with the panel 160 or hovering over the panel 160. This can reduce undesirable effects resulting from the user accidentally touching the panel 160 while using the pen device 110.

Figure 2:
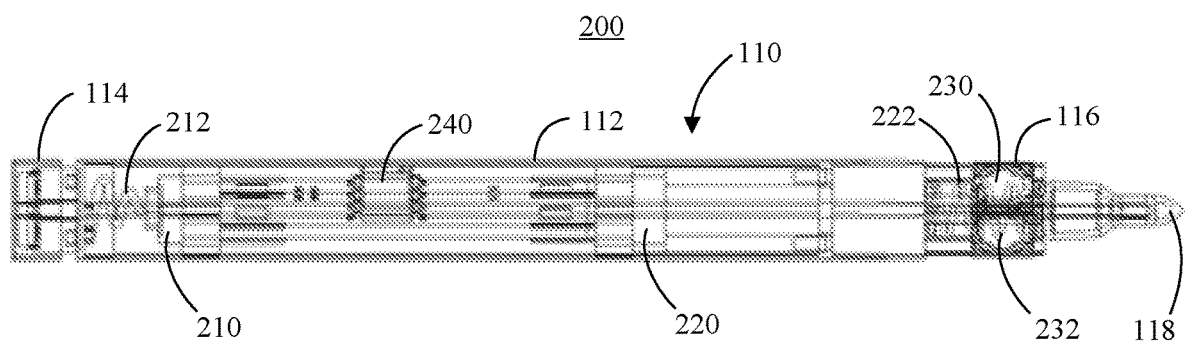
FIG. 2 depicts a structural view depicting an example structure of a pen device.

FIG. 2 depicts a structural view depicting an example structure 200 of the pen device 110. In addition to the case 112, click member 114, grip 116 and nib 118, the structural view depicts various internal components of the pen device 110. In illustration, the pen device 110 can include a button 210 operable by the user depressing the click member 114, and a spring 212 configured to return the click member 114 to an undepressed position responsive to the user releasing pressure the click member 114. In another arrangement, rather than operating the button 210 using the click member 114, the button 210 can be configured to be operable by the user pushing on the case 112, for example by depressing opposite sides of the case 112. This can simplify the outward appearance of the pen device 110.

The pen device 110 also can include a button 220 operable by the user depressing the nib 118, and a spring 222 configured to return the nib 118 to an undepressed position responsive to the user releasing pressure on the nib 118. Further, the pen device 110 can include one or more buttons 230, 232 disposed beneath the grip 116 and configured to receive user inputs (e.g., button depressions and button releases). For example, the pen device 110 can include the buttons 230, 232, and one or more additional buttons (not shown for clarity) on sides of the case 112 opposing the sides of the case 112 where the buttons 230, 232 are disposed. The user can depress the buttons 230, 232 by depressing areas of the grip 116 covering the buttons. In one arrangement, the grip can include visual indicators indicating where the one or more buttons 230, 232 are located. For example, the grip can indicate a respective letter, number or color above each of the buttons 230, 232. The buttons 230, 232 can include springs configured to return the respective buttons to their undressed positions responsive to the user releasing pressure on the respective buttons.

The buttons 210, 220, 230, 232 can be operable between a first state, for example an open state, and a second state, for example a closed state. In aspect of the present arrangements, initially the buttons 210, 220, 230, 232 can be set in the first state. Responsive to being depressed, the buttons 210, 220, 230, 232 can operate to the second state. The buttons 210, 220, 230, 232 can remain in the second state until the user releases pressure on the buttons 210, 220, 230, 232, or until the user again depresses the buttons 210, 220, 230, 232. Not all buttons need to operate in the same manner, however. For example, the buttons 210, 220 can remain in the second state until the user releases pressure on the buttons 210, 220, and the buttons 230, 232 can remain in the second state until the user again depresses the buttons 230, 232. In another example, the button 210 can operate between a first state in which a first switch is closed and a second switch is open, and a second state in which the first switch is open and the second switch is closed.

In addition to, or in lieu of, one or more of the buttons 210, 220, 230, 232, the pen device 110 can include one or more joysticks, sliders and/or tactile sensors, etc. integrated into case 112. The pen device 110 also can include electronic circuitry 240 disposed within the case 112. The electronic circuitry 240 can be configured to output the electromagnetic signal(s) 150 through the nib 118. As will be described, interaction with the buttons 210, 220, 230, 232 (and/or joysticks, sliders, tactile sensors, etc.) can result in capacitive coupling of electromagnetic signals 150 from the nib 118 to the panel 160. The frequencies contained in the electromagnetic signals 150, or modulation of the electromagnetic signals 150, can be controlled via the buttons 210, 220, 230, 232 (and/or joysticks, sliders, tactile sensors, etc.). In one aspect, the electronic circuitry 240 also can include a personal area network controller configured to communicate with the electronic device 140.

Figure 3:
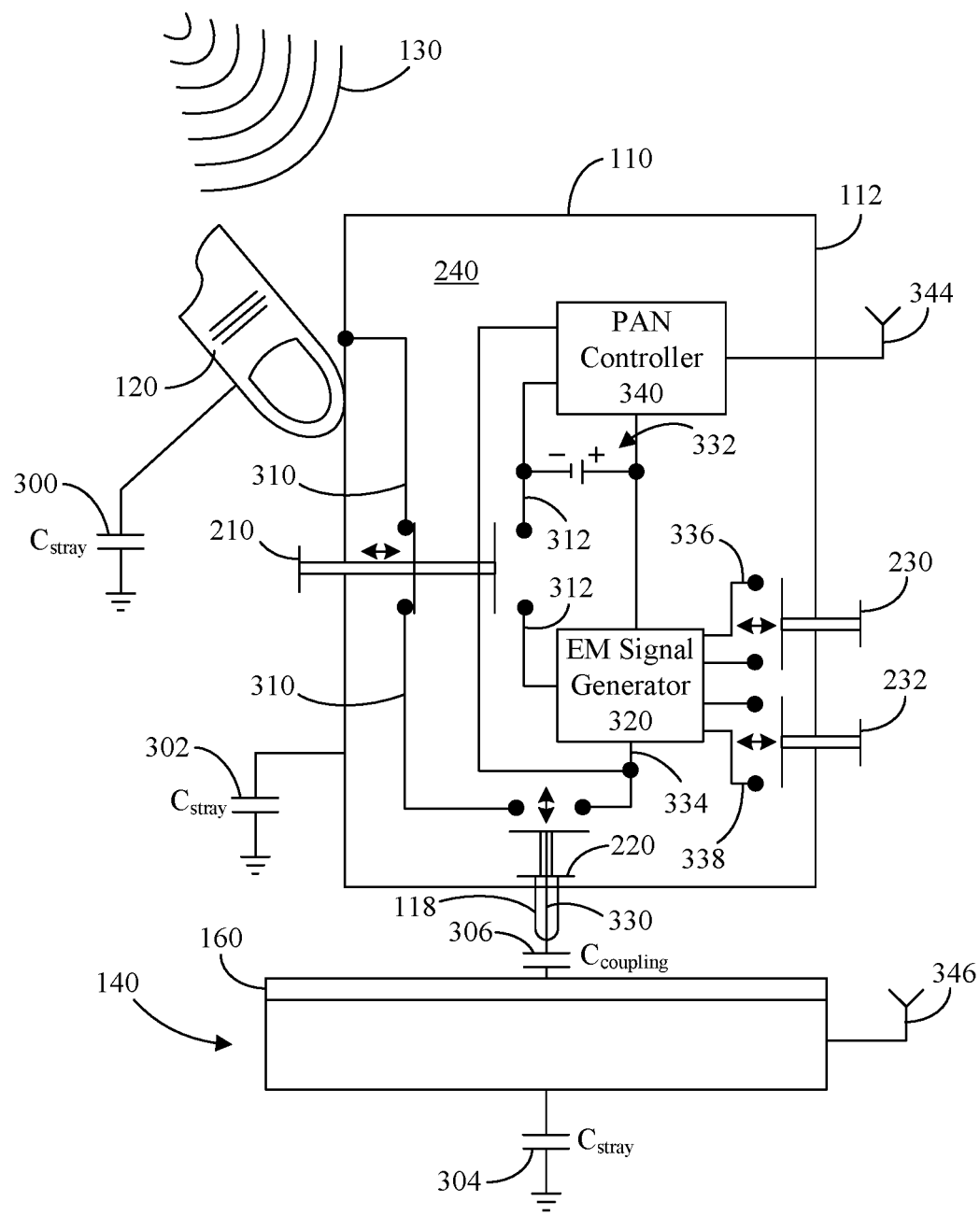
FIG. 3 depicts is a block diagram illustrating example architectures of a pen device and interaction of the pen device with a panel of an electronic device.

FIG. 3 is a block diagram illustrating example architectures of the pen device 110 and interaction of the pen device 110 with the panel 160 of the electronic device 140. As noted, the pen device 110 can include a case 112 that detects electromagnetic noise signals 130 generated in an environment in which the pen device 110 is located, directly and/or through a user appendage 120.

The capacitors 300, 302, 304 depicted in FIG. 3 represent stray capacitances (e.g., parasitic capacitances), between the user appendage 120, the pen device 110 and the electronic device 140, respectively, and ground potential. Further, the capacitor 306 represents coupling capacitance between the nib 118 of the pen device 110 and the panel 160 of the electronic device 140. In this regards, the capacitors 300-306 are not physical capacitors, but instead are depicted in FIG. 3 to show effects due to capacitive coupling.

The electronic circuitry 240 of the pen device 110 can include a circuit path 310 between the case 112 and the nib 118. The buttons 210, 220 can be user operable to close the circuit path 310, which can conduct the electromagnetic noise signal 130 from the case 112 to the nib 118, thereby passively outputting the electromagnetic noise signal 130 as the electromagnetic signal 150 (FIG. 1) via the nib 118. In illustration, the button 210 can be operable between a first state in which a portion of the circuit path 310 controlled by the button 210 is closed, and a second state in which the portion of the circuit path 310 controlled by the button 210 is open. In the first state of the button 210, a circuit path 312 that activates operation of (e.g., provides power to) an electromagnetic signal generator (EM signal generator) 320 can remain open, and thus the EM signal generator 320 can be in an off state. In the second state of the button 210, the circuit path 312 can be closed, and thus the EM signal generator 320 can be in an on state. For example, in the second state the button 210 can close a circuit path between a power supply 332 and the EM signal generator 320.

The power supply 332 can include, for example, one or more batteries and/or one or more piezoelectric power devices that generate power based on movement of the pen device 110 and/or movement of one or more components (e.g., buttons, etc.) responsive to user inputs. In another aspect, passive techniques can be used to generate power for the pen device 110. For example, the pen device 110 can include components configured to filter the electromagnetic noise signals 130 and inject certain frequency components into the electromagnetic signal(s) 150. Such components can predictably produce detectable changes in the amplitude, phase, or amplitude and phase, of particular frequency components of the electromagnetic signal(s) 150.

The button 220 can be configured to operate between a first state in which a component of the nib 118, such as a conductor 330 (e.g., nib antenna), is not connected to the circuit path 310 nor an output conductor 334 of the EM signal generator 320, and a second state in which the conductor 330 is connected to the circuit path 310 and the output conductor 334. The button 220 can operate from the first state to the second state in response to the nib 118 being depressed. The nib 118 can be depressed, for example, by asserting pressure on the nib 118 against the panel 160. In one arrangement, the button 220 can be operated from the second state back to the first state by the nib 118 again being depressed. In another arrangement, the button 220 can be operated from the second state back to the first state by pressure on the nib 118 against the panel 160 (or other object) being released.

If the button 210 is in the first state, and the button 220 is in the second state, the circuit path 310 can be electrically connected to the conductor 330. Thus, the electromagnetic noise signal 130 can be conducted via the circuit path 310 to the nib 118 and output as the electromagnetic signal 150 (shown in FIG. 1). If the button 210 is in the second state and the button 220 is in the second state, the output conductor 334 of the EM signal generator 320 can be electrically connected to the conductor 330, and electromagnetic signals generated by the EM signal generator 320 can be conducted to the nib 118 and output as the electromagnetic signals 150. Via capacitive coupling, the panel 160 can detect the electromagnetic signals 150. For example, electrodes, wires and/or sensors of the panel 160 can detect the electromagnetic signals 150.

The buttons 230, 232 can control operation of the EM signal generator 320. For example, each of the buttons 230, 230 can be operable between a first state in which a respective circuit path of the EM signal generator 320 is open and a second state in which a respective circuit path 336, 338 of the EM signal generator 320 is closed. If both buttons 230, 232 are in the first state (open), the EM signal generator 320 can operate in a first mode (e.g., default mode) and output a first electromagnetic signal 150 to include a first set of one or more electromagnetic frequencies. If the button 230 is in the second state (open) and the button 232 is in the first state (closed), the EM signal generator 320 can operate in a second mode and output a second electromagnetic signal 150 to include a second set of one or more electromagnetic frequencies. If the button 230 is in the second state (closed) and the button 232 is in the second state (closed), the EM signal generator 320 can operate in a third mode and output a third electromagnetic signal 150 to include a third set of one or more electromagnetic frequencies.

The electronic circuitry 240 of the pen device 110 further can include a personal area network (PAN) controller 340. The PAN controller 340 can include, for example, a Bluetooth® transmitter/transceiver. The PAN controller 340 can be communicatively linked to the output conductor 334 of the EM signal generator 320. The PAN controller 340 can receive the electromagnetic signals 150 generated by the EM signal generator 320, encode the electromagnetic signals into an RF signal, and communicate the RF signal to the electronic device 140 via an antenna 344. The electronic device 140 can receive the RF signal via an antenna 346, and process the RF signal using a respective PAN controller (not shown) to decode the electromagnetic signals 150. Thus, if the nib 118 is not with a threshold distance of the panel 160 in which the panel 160 is able to detect the electromagnetic signals 150, the electronic device 140 can receive the electromagnetic signals 150 via a PAN. In one arrangement, the PAN controller 340 can be configured to activate and generate the RF signal in response to the button 220 being in the first state in which the conductor 330 is not electrically connected to the circuit path 310 or the output conductor 334.

In a further arrangement, in lieu of, or in addition to, the button 220, the pen device 110 can include a pressure sensor (not shown) that detects an amount of pressure on the nib 118. One example of such a sensor is a force sensitive resistor having a resistance value that changes according to a level of pressure exerted on the resistor, although the present arrangements are not limited in this regard. In such an arrangement, the EM signal generator 320 can be configured to selectively generate the electromagnetic signals 150 according to an amount of pressure exerted on the nib 118.

The EM signal generator 320 can include one or more timer circuits using one or more timer integrated circuits (ICs), other ICs, resonators and/or other types of circuits suitable for generating electromagnetic signals 150.

Figure 4:
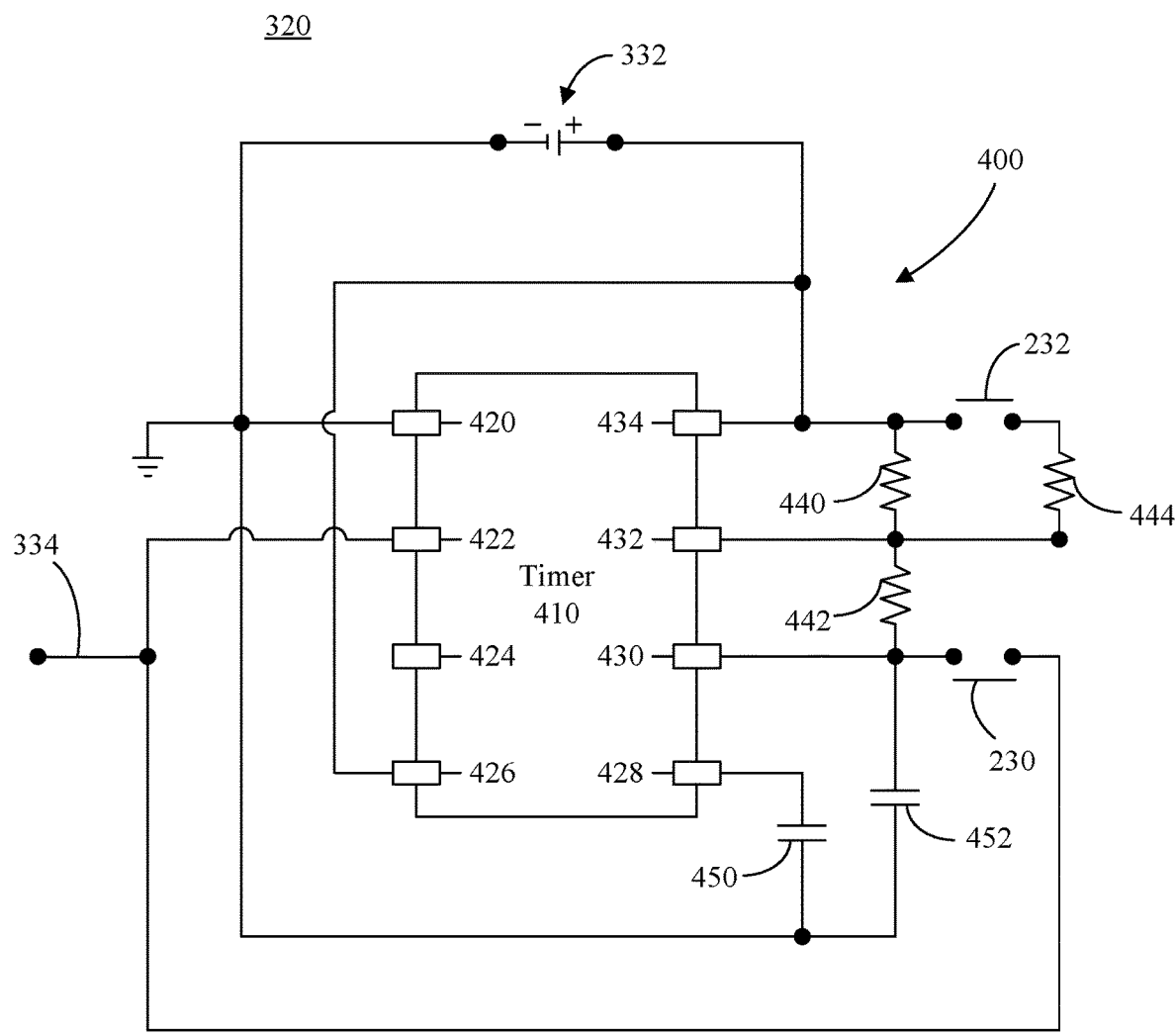
FIG. 4 depicts a schematic diagram of an electromagnetic signal generator of a pen device.

FIG. 4 depicts an example of a schematic diagram of the EM signal generator 320 of FIG. 3. The EM signal generator 320 can include a timer circuit 400 that includes a timer 410, which is a type of integrated circuit known in the art. The timer 410 can receive power from the power supply 332 (FIG. 3). The EM signal generator 320 also can include a variety of electronic components electrically coupled to pins 420, 422, 424, 426, 428, 430, 432, 434 of the timer 410. For example, a resistor 440 can be connected between pins 432 and 434, a resistor 442 can be connected between pins 430 and 432, and a resistor 444 can be selectively connected between pins 432 and 435 via the button 232. The button 232 can operate as a switch in the timer circuit 400. A capacitor 450 can be connected between pin 428 and pin 420, and a capacitor 452 can be connected between pin 430 and pin 420. Further, the button 230 can operate as a switch selectively connecting pin 430 to pin 422, to which the output conductor 334 of FIG. 3 also can be connected.

When both of the buttons 230, 232 are in the first state (switches open), the timer circuit 400 can operate in a first mode (e.g., default mode) and output the first electromagnetic signal 150 with a first frequency spectrum. The first frequency spectrum can be the frequency spectrum of electromagnetic noise signals 130 coupling onto circuitry of the timer circuit 400 in the environment in which the pen device 110 is located. The timer circuit 400 can detect the electromagnetic noise signals 130 coupling onto internal circuitry of the timer 410 or external circuitry. In one arrangement, one or more pins 420-434 can be electromagnetically coupled to the case 112 of the pen device 110 and detect the electromagnetic noise signals 130 via such coupling. The timer circuit 400 can amplify the electromagnetic noise signal 130 and output the amplified electromagnetic noise signal 130 as the electromagnetic signal 150. In one aspect, the output level of the electromagnetic signal 150 can be determined by a value of the resistance of the output conductor 334. Nonetheless, variations on the present arrangements can integrate amplifiers or additional circuitry, such as electrical components increasing electrical impedance match between the conductor 334 and interfacing material(s), for example interfacing materials of the panel 160 and/or sensors 170, 172, 174, 176.

When the button 230 is in the second state (switch closed) and the button 232 is in the first state (switch open), the timer circuit 400 can operate in a second mode and output the second electromagnetic signal 150 with a second frequency spectrum. When the button 230 is in the second state (switch closed) and the button 232 is in the second state (switch closed), the timer circuit 400 can operate in a third mode and output the third electromagnetic signal 150 with a third frequency spectrum.

As noted, the pen device 110 can include one or more pressure sensors, such as one or more force sensitive resistors and/or one or more force sensitive capacitors having resistance/capacitance values that vary depending on amount of force exerted on the resistors/capacitors. The force sensitive resistor(s) can be used as the resistor 440, the resistor 442 and/or the resistor 444. The force sensitive capacitor(s) can be used as the capacitor 450 and/or capacitor 452. Accordingly, the frequency spectrum of the second and third electromagnetic signals 150 can be selectively controlled by an amount of force applied to the pressure sensor(s). In another aspect, resistor(s) and/or capacitor(s) having resistance/capacitance values that vary depending on a level of audio noise detected by the resistor(s)/capacitor(s), a level of vibration detected by the resistor(s)/capacitor(s) and/or a proximity of a device or appendage to the resistor(s)/capacitor(s). Accordingly, the frequency spectrum of the second and third electromagnetic signals 150 can be selectively controlled by any such phenomenon.

In a further arrangement, one or more of the resistors 440-444 can be variable resistors and/or one or more of the capacitors 450, 452 can be variable capacitors. The timer circuit 400 also can include one or more variable inductors (not shown). In such arrangements, the pen device 110 can include one or more user input devices configured to receive user inputs to change the resistor/capacitor/inductor value(s). Further, the pen device 110 can include one or more variable resistors/capacitors/inductors not connected to the timer circuit 400, for example in addition to or in lieu of the timer circuit 400.

In another aspect of the present arrangements, in addition to, or in lieu of the timer circuit 400, the electronic device can include one or more ICs configured to encode the electromagnetic signals 150 for various purposes, for example to enhance detectability of the electromagnetic signals 150 and/or secure the electromagnetic signals 150. Further, the one or more ICs can integrate modulation schemes, such as frequency shift keying, amplitude modulation, etc.

FIG. 5 is depicts graphs 500, 520, 540 of example frequency spectrums 502, 522, 544 of different electromagnetic signals 150 (FIG. 1) output by the pen device 110. The graph 500 can represent the first electromagnetic signal 150 output in a first mode (e.g., default mode) of the pen device 110. In the first mode, the electromagnetic signals 150 output by the pen device 110 can include the frequency spectrum 502. The frequency spectrum 502 can include a base frequency 510 and harmonics 512, 514 of that base frequency 510. The harmonics 512, 514 may have a lower power spectral density (PSD) (e.g., amplitude) than the base frequency 510, but the present arrangements are not limited in this regard. The frequency spectrum 502 can be the frequency spectrum of the electromagnetic noise signal 130. For example, if the electromagnetic noise signal is generated from a 60 Hz power signal, the base frequency 510 can be 60 Hz, the harmonic 512 can be 120 Hz, and the harmonic 514 can be 180 Hz. The electromagnetic noise signal also can include additional harmonics, which may be detectable up to the Nyquist frequency of the electromagnetic field sensitive hardware (e.g., signal processor 635 of FIG. 6) used to digitize the electromagnetic signals detected by the panel 160 and/or sensors 170, 172, 174, 176. In the first mode, the electromagnetic signal 150 output by the pen device 110 can be output passively using the detected electromagnetic noise signal 130 without use of the EM signal generator 320 (FIGS. 3 and 4), or actively using the EM signal generator 320 (FIGS. 3 and 4). The PSD of the base frequency 510 and harmonics 512, 514 can depend on whether the electromagnetic signal 150 is output passively or actively.

The graph 520 can represent the second electromagnetic signal 150 output in a second mode of the pen device 110. In the second mode, the electromagnetic signal 150 output by the pen device 110 can be output by the EM signal generator 320, and can include the frequency spectrum 522. The frequency spectrum 522 can include the base frequency 510 and harmonics 512, 514 contained in the frequency spectrum 502, but also can include at least a first additional frequency 530 that is different from the base frequency 510 and harmonics 512, 514. The frequency 530 can be determined by the values of the resistors 440, 442 and capacitors 450, 452 of FIG. 4. In this regard, one of ordinary skill in the art can select the resistors 440, 442 and capacitors 450, 452 to achieve the desired frequency 530. The PSD of the additional frequency 530 can be higher than the PSD of the base frequency 510, though this need not be the case. Inclusion of the frequency 530 in the second electromagnetic signal 150 can indicate to the electronic device 140 to initiate a process corresponding to (e.g., indicated by) the second electromagnetic signal 150.

The graph 540 can represent the third electromagnetic signal 150 output in a third mode of the pen device 110. In the third mode, the electromagnetic signal 150 output by the pen device 110 can be output by the EM signal generator 320, and can include the frequency spectrum 542. The frequency spectrum 542 can include the base frequency 510 and harmonics 512, 514 contained in the frequency spectrum 502, but also can include at least a second additional frequency 550 that is different from the base frequency 510, the harmonics 512, 514 and the first additional frequency 530. The frequency 550 can be determined by the values of the resistors 440, 442, 444 and capacitors 450, 452 of FIG. 4. In this regard, one of ordinary skill in the art can select the resistors 440, 442, 442 and capacitors 450, 452 to achieve the desired frequency 530. Again, the PSD of the second additional frequency 550 can be higher than the PSD of the base frequency 510, though this need not be the case. Inclusion of the frequency 550 in the third electromagnetic signal 150 can indicate to the electronic device 140 to initiate a process corresponding to (e.g., indicated by) the third electromagnetic signal 150.

The pen device also can generate electromagnetic signals 150 in a myriad of other modes of the pen device 110, and the frequency spectrum output for each electromagnetic signal 150 can be different. The electronic device 140 can be configured to detect the various frequency spectrums in the electromagnetic signals 150 and initiate processes corresponding to those frequency spectrums. In this regard, varying the specific frequencies and/or amplitudes of signals contained in the electromagnetic signals can enable pen mode differentiation by the electronic device 140. For example, the electronic device 140 can statistically track the PSDs normalized by spectral energy at specific frequencies. Laboratory testing on a pen device prototype confirmed the robustness of the pen device mode switching capability in variable electromagnetic noise environments.

Figure 6:
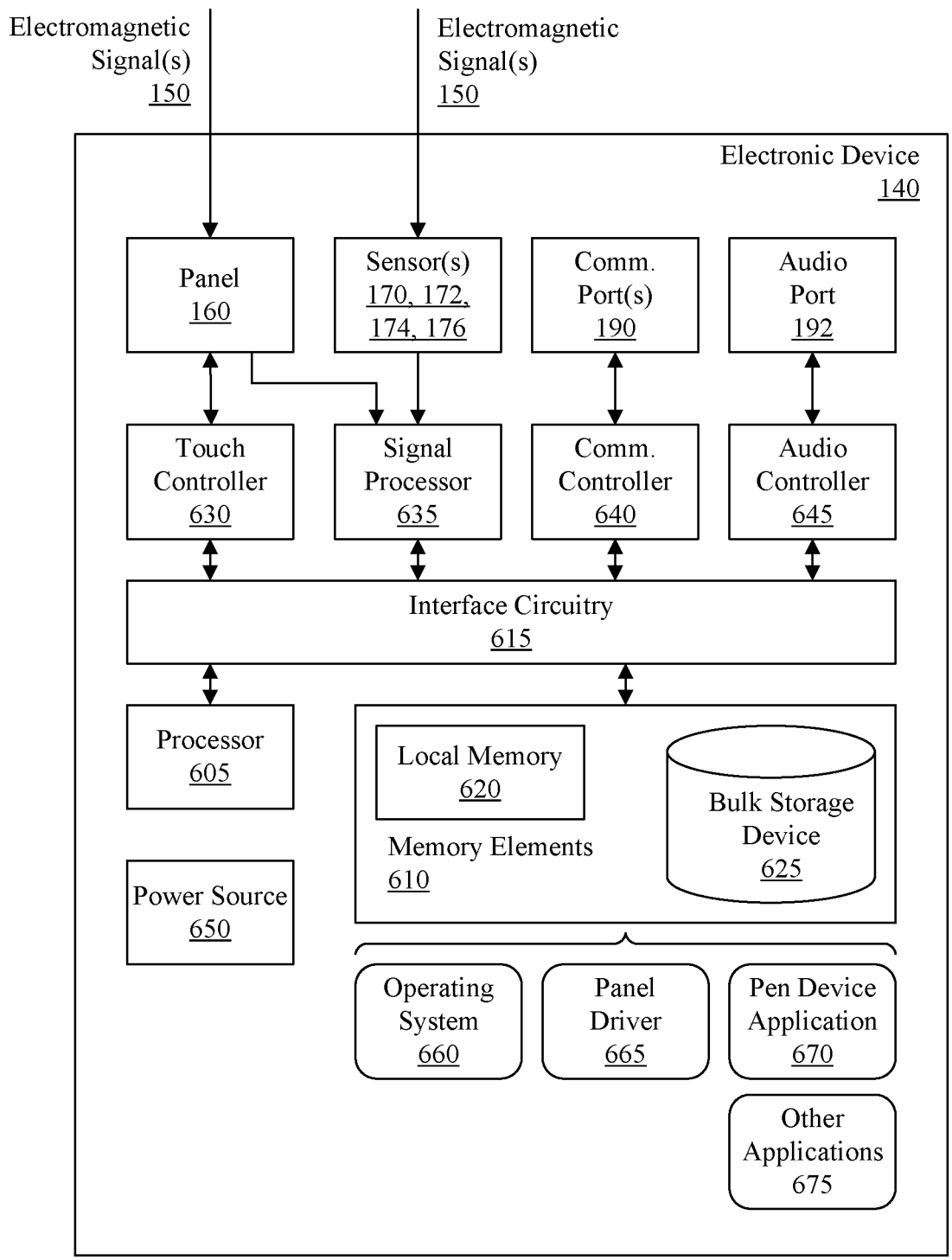
FIG. 6 is a block diagram illustrating example architecture for an electronic device.

FIG. 6 is a block diagram illustrating example architecture for the electronic device 140. The electronic device 140 can include at least one processor 605 (e.g., a central processing unit, a digital signal processor, a data processor, an application specific integrated circuit, etc.) coupled to memory elements 610 via interface circuitry 615 (e.g., a system bus or other suitable circuitry). As such, the electronic device 140 can store program code within the memory elements 610. The processor 605 can execute the program code accessed from the memory elements 610 via the interface circuitry 615. In one aspect, the processor 605, memory elements 610, and/or interface circuitry 615 can be implemented as separate components. In another aspect, the processor 605, memory elements 610, and/or interface circuitry 615 can be integrated in one or more integrated circuits. The various components in the electronic device 140, for example, can be coupled by one or more communication buses or signal lines (e.g., interconnects and/or wires). In one aspect, the memory elements 610 may be coupled to interface circuitry 615 via a memory interface (not shown).

The memory elements 610 can include one or more physical memory devices such as, for example, local memory 620 and one or more bulk storage devices 625. Local memory 620 refers to random access memory (RAM) (e.g., volatile memory) or other non-persistent memory device(s) generally used during actual execution of the program code. The bulk storage device(s) 625 can be implemented as a hard disk drive (HDD), solid state drive (SSD), or other persistent data storage device. The electronic device 140 also can include one or more cache memories (not shown) that provide temporary storage of at least some program code in order to reduce the number of times program code must be retrieved from the bulk storage device 625 during execution.

As noted, the electronic device 140 can include a panel 160 and, optionally, sensors 170, 172, 174, 176. The panel 160 can be operatively coupled to a touch controller 630. The touch controller 630 can be configured to receive from the panel 160 signals corresponding to touches of, or hovering over, the panel 160, for example by one or more appendages of a user (e.g., fingers) and the pen device 110, determine where on the panel the touches are detected, and communicate corresponding data to the processor 605, for example via the interface circuitry 615. In the case of a capacitive touchscreen, hovering can be determined if a touch is not detected, but a level of capacitance be an appendage or pen device 110 at least meets a threshold value. Further, a segment of the panel 160 indicating the highest capacitance can be determined to be the segment over which the appendage or pen device 110 is hovering. Still, other processes can be implemented to determine where the appendage or pen device 110 is hovering, and the present arrangements are not limited in this regard.

Further, the panel and sensors 170-176 can be operatively coupled to a signal processor 635. In one aspect of the present arrangements, the signal processor 635 can be integrated into the touch controller 630. The panel 160 can be configured to detect the electromagnetic signal(s) 150 output by the pen device, and communicate the electromagnetic signal(s) 150 to the signal processor 635. Similarly, the sensors 170-176 can be configured to detect the electromagnetic signal(s) 150 output by the pen device, and communicate the electromagnetic signal(s) 150 to a signal processor 635. The signal processor 635 can be configured to process the electromagnetic signal(s) 150, for example to decode the electromagnetic signal(s) 150, as will be further described, and output corresponding data. The signal processor 635 can be coupled to the processor 605 via the interface circuitry 615, and output the data to the processor 605. The processor 605 can process the data received from the signal processor 635 and, in response, initiate any of a variety of processes on the electronic device 140.

The data generated by the signal processor 635 can be configured accordingly to which of the panel 160 or sensors 170-176 communicated the electromagnetic signal(s) 150 to the signal processor. For example, data generated based on electromagnetic signal(s) 150 received from the panel 160 can include certain corresponding data items, and data generated based on electromagnetic signal(s) 150 received from the respective sensors 170-176 can include certain corresponding data items. Thus, the data generated by the signal processor 635 can be based, not only on the electromagnetic signal(s) 150, but also the component of the electronic device 140 that detected the electromagnetic signal(s) 150. With regard to the panel 160, the data generated by the signal processor 635 further can be based on the segment of the panel 160 detecting the electromagnetic signal(s) 150. The processor 605 can initiate any of a variety or processes based on the data.

Moreover, the signal processor 635 can be configured to detect touches of a user's appendage (e.g., a finger) on the panel 160, and distinguish the appendage touches from touches by the pen device 110. The signal processor 635 can generate data corresponding to the detected appendage touches. Such data can include data items unique the appendage touches. The processor 605 can be configured to initiate different processes based on whether data received from the signal processor 635 corresponds to a touch of a user appendage or a touch of the pen device 110.

I/O devices can be coupled to interface circuitry 615. Examples of I/O devices can include, but are not limited to, one or more communication ports 190 and an audio port 192. The communication port(s) 190 can be coupled to the processor 605 via a communication controller 640 (e.g., host controller) and the interface circuitry 615. In one arrangement, the communications controller 640 can be a component of the processor 605, and the communication port(s) 190 can couple to the communication controller 640 via the interface circuitry. The audio port 192 can be coupled to the processor 605 via an audio controller 645 and the interface circuitry 615. In one arrangement, the audio controller 645 can be a component of the processor 605, and the audio port 192 can couple to the audio controller 645 via the interface circuitry.

In one aspect of the present arrangements, the communication controller 640 and/or the audio controller 645 can be coupled to the signal processor 635 via the interface circuitry 615. The communication port(s) 190 and/or audio port 192 can be configured to also detect the electromagnetic signal(s) 150, and the respective communication controller 640 and/or audio controller 645 can communicate the electromagnetic signal(s) 150 to the signal processor 635. In such an arrangement, the electromagnetic signal(s) 150 detected by the communication port(s) 190 and/or audio port 192 can be processed to detect the pen device 110 being positioned proximate to (e.g., within a threshold distance of) the communication port(s) 190 and/or audio port 192, for example as previously described, for example in lieu of the sensors 174, 176.

The electronic device 140 further includes a power source 650. The power source 650 is capable of providing electrical power to the various elements of the electronic device 140. In one arrangement, the power source 650 can be implemented as one or more batteries. The batteries may be implemented using any of a variety of different battery technologies whether disposable (e.g., replaceable) or rechargeable. In another arrangement, the power source 650 can be configured to obtain electrical power from an external source and provide power (e.g., DC power) to the elements of the electronic device 140. In the case of a rechargeable battery, the power source 650 further may include circuitry that is capable of charging the battery or batteries when coupled to an external power source.

The memory elements 610 can store software components of the electronic device 140, for example an operating system 660, a panel driver 665, a pen device application 670 and various other applications 675. The operating system 660 may include instructions for handling system services and for performing hardware dependent tasks. Examples of the operating system 660 include, but are not limited to, LINUX, UNIX, a mobile operating system, an embedded operating system, etc. The panel driver 665 can include computer program code that enables communication between the touch controller 630 and the operating system 660 and/or the pen device application 670. The panel driver also can enable communications between the signal processor 635 and the operating system 660 and/or the pen device application 670.

The pen device application 670 can be configured to initiate any of a variety of processes on the electronic device 140 based on the data generated by the signal processor 635 and, optionally, the touch controller 630. As noted, examples of such processes can include, but are not limited to, mode switching of the pen device 110, electronic device 140 mode switching, copy operations, cut operations, paste operations, hover operations, access certain types of data, menu item selections, initiating shortcut operations, imitating application navigation operations, and so on. The various processes can be determined based not only on the data generated by the signal processor 635 and, optionally, the touch controller 630, but also on an application 675 that currently is open and active on the electronic device 140 (e.g., an application having focus in the user interface of the electronic device 140.)

The memory elements 610 may also store other program code (not shown). Examples of other program code may include instructions that facilitate communicating with one or more additional devices, one or more computers and/or one or more servers; graphic user interface processing; sensor-related processing and functions; phone-related processes and functions; electronic-messaging related processes and functions; Web browsing-related processes and functions; media processing-related processes and functions; GPS and navigation-related processes and functions; security functions; camera-related processes and functions including Web camera and/or Web video functions; and so forth. The memory elements 610 also may store one or more other application(s) (not shown).

The various types of instructions and/or program code described are provided for purposes of illustration and not limitation. The program code may be implemented as separate software programs, procedures, or modules. The memory elements 610 can include additional instructions or fewer instructions. Furthermore, various functions of electronic device 140 may be implemented in hardware and/or in software, including in one or more signal processing and/or application specific integrated circuits.

Program code stored within the memory elements and any data items used, generated, and/or operated upon by electronic device 140 are functional data structures that impart functionality when employed as part of the device. Further examples of functional data structures include, but are not limited to, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements in a memory. A data structure imposes physical organization on the data stored in the memory as used by a processor.

The electronic device 140 may include fewer components than shown or additional components not illustrated in FIG. 6 depending upon the particular type of system that is implemented. In addition, the particular operating system and/or application(s) and/or other program code included may also vary according to system type. Further, one or more of the illustrative components may be incorporated into, or otherwise form a portion of, another component. For example, a processor may include at least some memory.

The electronic device 140 is provided for purposes of illustration and not limitation. A device and/or system configured to perform the operations described herein may have a different architecture than illustrated in FIG. 6. The architecture may be a simplified version of the architecture described in connection with the electronic device 140 and include a processor and memory storing instructions. The architecture may include one or more sensors as described herein. The electronic device 140, or a system similar to electronic device 140, is capable of collecting data using the various sensors of the device or sensors coupled thereto. It should be appreciated, however, that the electronic device 140 may include fewer sensors or additional sensors.

Figure 7:
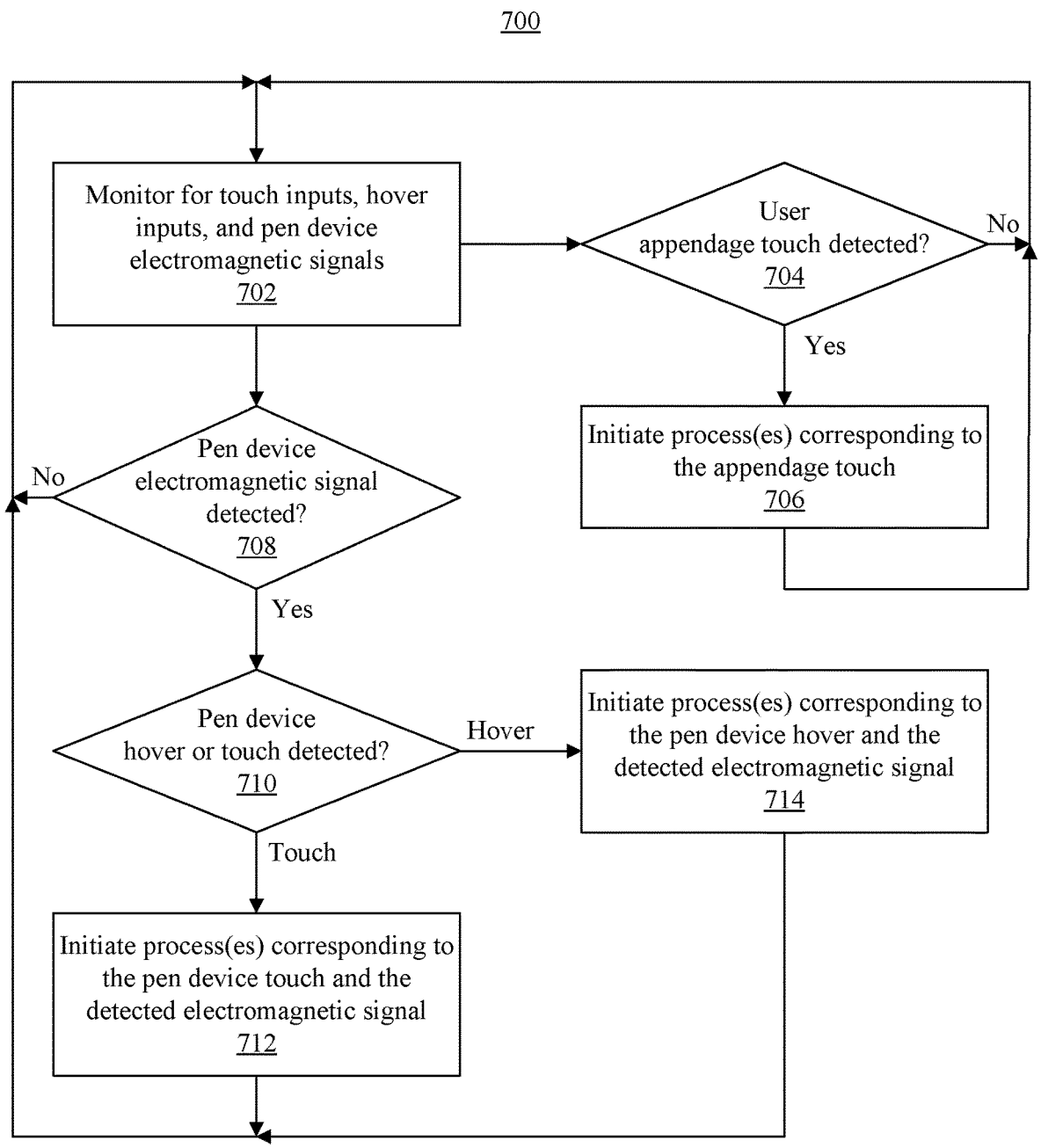
FIG. 7 is flow chart illustrating an example of a method of initiating operations responsive to detecting inputs to a panel of an electronic device.

FIG. 7 is flow chart illustrating an example of a method 700 of initiating operations responsive to detecting inputs to a panel 160 of an electronic device 140. The method 700 can be implemented by the electronic device 140 (FIGS. 1 and 6).

At step 702, the electronic device 140 can monitor for touch inputs, hover inputs and electromagnetic signal(s) 150. For instance, the electronic device 140 can monitor for touches by one or more user appendages, touches by the pen device 110, hovering of the pen device 110 and electromagnetic signal(s) 150 output by the pen device 110. The electronic device 140 can monitor for touch inputs, hover inputs and electromagnetic signal(s) 150 using the panel 160 and the touch controller 630 (FIG. 6), and, optionally, the sensors 170-176, the communication port(s) 190 and/or the audio port 192.

In this regard, the electronic device 140 can determine locations where the electromagnetic signal(s) 150 are detected by the electronic device 140, including locations on the panel 160 and locations of the sensors 170-176, the communication port(s) 190 and/or the audio port 192. The electronic device 140 can, based on the electromagnetic signal(s) 150 and the locations, determine the engagement of nib 118 with the electronic device 140, on/off state of the buttons of the pen device 110, identifiers for button numbers, length of button press, etc.

Referring to decision box 704, responsive to the electronic device 140 detecting a touch by one or more user appendages on the panel 160 (or the sensors 170-176, the communication port(s) 190 or the audio port 192), the process can proceed to step 706. At step 706, the electronic device 140 can initiate processes corresponding the touch(es) by the appendage(s). For example, the electronic device 140 can implement any of a variety of processes known in the art that are implemented in response to user touches. The process can return to step 702 and the electronic device 140 can continue monitoring for touch inputs, hover inputs and electromagnetic signal(s) 150. Referring again to decision box 704, responsive to the electronic device 140 detecting a touch by one or more user appendages, the process can return to step 702 and the electronic device 140 can continue monitoring for touch inputs, hover inputs and electromagnetic signal(s) 150.

Referring to decision box 708, responsive to the electronic device 140 detecting an electromagnetic signal 150 propagated by the pen device 110, the process can proceed to decision box 710. Otherwise, the process can return to step 702 and the electronic device 140 can continue monitoring for touch inputs, hover inputs and electromagnetic signal(s) 150.

Referring to decision box 710, the electronic device 140 can determine whether a hover or touch of the pen device 110 is detected. The electronic device 140 can determine a touch of the pen device is detected if detection of the electromagnetic signal 150 corresponds to a touch detected by the panel 160, or can determine a touch of the pen device is detected if detection of the electromagnetic signal 150 corresponds to a touch detected by a sensor 170-176. A touch can be detected if a signal strength of the detected electromagnetic signal 150 is above a threshold value or, in the case of a capacitive touch panel, a level of capacitance change detected is above a threshold value. In one arrangement, the electronic device 140 can determine a hover is detected if detection of the electromagnetic signal 150 does not correspond to a touch detected by the panel 160 or a sensor 170-176. In another arrangement, the electronic device 140 can determine a hover is detected if a signal strength of the detected electromagnetic signal 150 is equal to or below a threshold value or, in the case of a capacitive touch panel, a level of capacitance detected is equal to or below a threshold value.

If a touch of the pen device 110 is detected, at step 712, the electronic device 140 can initiate processes corresponding to the pen device touch and the detected electromagnetic signal 150. In this regard, via the touch controller 630, the electronic device 140 can determine where on the panel 160 the pen device touches, or via a sensor 170-176, determine a sensor touched by the pen device 110. Further, the electronic device 140 can receive data from the signal processor 635 corresponding to the detected electromagnetic signal 150. Based on where the touch is detected and the received data, the electronic device 140 can select one or more processes that correspond to the touch location(s) and the data, and initiate such process(es). The process can return to step 702 and the electronic device 140 can continue monitoring for touch inputs, hover inputs and electromagnetic signals 150.

Referring again to decision box 710, if a hover is detected, the process can proceed to step 714. At step 714, the electronic device 140 can initiate processes corresponding to the pen device hover and the detected electromagnetic signal 150. In this regard, via the touch controller 630, the electronic device 140 can determine where on the panel 160 the pen device 110 is hovering (e.g., within a threshold distance) or, via a sensor 170-176, the communication port 190 or audio port 192, determine near which sensor 170-176 or port 190, 192 the pen device 110 is hovering (e.g., within a threshold distance). Further, the electronic device 140 can receive data from the signal processor 635 corresponding to the detected electromagnetic signal 150. Based on where the hover is detected and the received data, the electronic device 140 can select one or more processes that correspond to the hover location(s) and the data, and initiate such process(es). The process can return to step 702 and the electronic device 140 can continue monitoring for touch inputs, hover inputs and electromagnetic signals 150.

From time to time the user may change pen device modes, and thus the detected electromagnetic signals 150 may change and/or the user may move the pen device 110 between a touch state and a hover state, or move the pen device 110 away from the electronic device 140, in which case the electromagnetic signals 150 may no longer be detected. A finite state machine (FSM) can be used to interpret the user's selected mode for using the pen device 110 based on the detected electromagnetic signals 150. Frequencies contained in the electromagnetic signals 150 can be selectable through toggles of the pen device 110, pressure of pen toggles, or direct user manipulation of user interface elements (e.g. buttons, sliders, joysticks, tactile sensors, etc.) of the pen device 110.

FIG. 8 is flow chart illustrating an example of a method 800 of initiating operations responsive to detecting a pen device touch by a panel or sensor of an electronic device. The method 800 can be implemented by the electronic device 140 (FIGS. 1 and 6) at step 712 of FIG. 7.

At step 802, the panel 160/touch controller 630 can detect a location of the pen device touch on the panel 160, or a sensor 170-176 can detect a pen device touch of the sensor 170-176. At step 804, via the panel 160 or sensor 170-176, the signal processor 635 can detect at least one electromagnetic signal 150 output by the pen device 110. For example, an electromagnetic signal 150 can be detected by the panel 160 or a sensor 170-176 and communicated to the signal processor 635. At step 806, the signal processor 635 can process the at least one electromagnetic signal 150 output by the pen device 110 and output corresponding data. The data can indicate, for example, on/off states of buttons, buttons that are activated (e.g., closed), length(s) of button press(es), and so on.

At step 808, executing the pen device application 670, the processor 605 can initiate process(es) corresponding to detected location of the pen device touch and results of the processing performed on the at least one electromagnetic signal 150 output by the pen device 110. In illustration, an electromagnetic signal 150 output by the pen device 110 can be generated in response to a press or release of a first button of the pen device 110. The processor 605 can initiate processes corresponding to the press or release of the first button and the location of the pen device touch. In another example, an electromagnetic signal 150 output by the pen device 110 can be generated in response to a press or release of a second button of the pen device 110. The processor 605 can initiate processes corresponding to the press or release of the second button and the location of the pen device touch.

In another example, an electromagnetic signal 150 output by the pen device 110 can be generated in response to a long press (e.g., a press lasting longer than a threshold period of time) of the first button, a momentary press (e.g., a press lasting no longer than a threshold period of time), a long press of the second button of the pen device 110, or a momentary press of the second button of the pen device 110. The processor 605 can initiate processes corresponding to the nature of the button presses, the location of the pen device 110 touch, movement of the pen device 110 touch across at least a portion of the panel 160 (and the touched locations on the panel) and/or the duration of the pen device 110 touch. In this regard, the touch events can be tracked for the duration of the touch events. Still, any of a number of user inputs can be detected by processing the electromagnetic signal(s) 150, and corresponding processes can be initiated based on the electromagnetic signal(s) 150 and the pen device 110 touch locations.

The processes initiated in response to detecting the electromagnetic signal(s) 150 can be pre-programmed and trigger pre-programmed effects. In this regard, the pre-programmed processes can be mapped to, or otherwise associated with, specific electromagnetic signal(s) 150. In illustration, a particular pre-programmed process can be mapped to an electromagnetic signal 150 containing particular frequencies, or containing particular frequencies having particular PSDs or PSD ratios among the particular frequencies. Examples of such electromagnetic signals are depicted in FIG. 5. In addition, a particular pre-programmed process can be mapped to, or otherwise associated with, a particular location on the electronic device 140 where the electromagnetic signal 150 is detected, for example particular Cartesian coordinates on the panel where the nib 118 of the pen device 110 touches or hovers, Cartesian coordinates on the panel where the nib 118 is moved across, or a particular location at or within a threshold distance of a sensor 170, 172, 174, 176. Examples of pre-programmed processes/effects are described with respect to FIGS. 13-20.

FIG. 9 is flow chart illustrating an example of a method 900 of initiating operations responsive to detecting a pen device touch by a panel or sensor of an electronic device. The method 900 can be implemented by the electronic device 140 (FIGS. 1 and 6) at step 714 of FIG. 7.

At step 902, the panel 160/touch controller 630 can detect a location of the pen device hover over the panel 160, or a sensor 170-176 can detect a pen device hover within a threshold distance of the sensor 170-176. At step 904, via the panel 160 or sensor 170-176, the signal processor 635 can detect at least one electromagnetic signal 150 output by the pen device 110. For example, the electromagnetic signal 150 can be detected by the panel 160 or a sensor 170-176 and communicated to the signal processor 635. At step 906, the signal processor 635 can process the at least one electromagnetic signal 150 output by the pen device 110 and output corresponding data. The data can indicate, for example, on/off states of buttons, buttons that are activated (e.g., closed), length(s) of button press(es), and so on.

At step 908, executing the pen device application 670, the processor 605 can initiate process(es) corresponding to detected location of the pen device hover and results of the processing performed on the at least one electromagnetic signal 150 output by the pen device 110, for example in manners similar to those previously described with respect to step 808 of FIG. 8. For instance, the processor 605 can initiate processes corresponding to the nature of the button presses, the location of the pen device 110 hover, movement of the pen device 110 hover across at least a portion of the panel 160 (and the locations on the panel over which the pen device 110 was hovered) and/or the duration of the pen device 110 hover. In this regard, the hover events can be tracked for the duration of the hover events. Still, any of a number of user inputs can be detected by processing the electromagnetic signal(s) 150, and corresponding processes can be initiated based on the electromagnetic signal(s) 150 and the pen device 110 hover locations. As noted, the processes initiated in response to detecting the electromagnetic signal(s) 150 can be pre-programmed and trigger pre-programmed effects.

FIG. 10 is flow chart illustrating an example of a method 1000 of generating data based on detected electromagnetic signal(s) 150 output by a pen device 110. The method 1000 can be implemented by the signal processor 635 (FIG. 6) of the electronic device 140, for example at step 806 of FIG. 8 or at step 906 of FIG. 9.

At step 1002, the signal processor 635 can identify at least a portion of a plurality of electromagnetic frequencies contained in the electromagnetic signal 150. In one non-limiting arrangement, the signal process 535 can limit the identification of the electromagnetic frequencies to one or more specific ranges of electromagnetic frequencies.

At step 1004, the signal processor 635 can determine, at least based on the identified portion of electromagnetic frequencies contained in the electromagnetic signal 150, corresponding data. For example, the signal processor can access a data table indicating various frequencies and data values corresponding to the various frequencies. Based on the identified frequencies, the signal processor 635 can identify data corresponding to the identified frequencies.

At step 1006, the signal processor 635 can output the identified data, for example to the pen device application 670 of FIG. 6. In this regard, the panel driver 665 (FIG. 6) can include computer program code that receives the data from the signal processor 635 and communicates the data to the pen device application 670 executed by the processor 605.

FIG. 11 is flow chart illustrating another example of a method 1100 of generating data based on detected electromagnetic signal(s) 150 output by a pen device 110. The method 1100 can be implemented by the signal processor 635 (FIG. 6) of the electronic device 140, for example at step 806 of FIG. 8 or at step 906 of FIG. 9.

At step 1102, the signal processor 635 can determine a duration of time the electromagnetic signal 150 is detected. At step 1104, the signal processor 635 can determine, at least based on the determined duration of time the electromagnetic signal 150 is detected, corresponding data. For example, the signal processor can access a data table indicating various electromagnetic signals 150 (e.g., frequencies or combinations of frequencies representing respective electromagnetic signals 150), periods of time, and data values corresponding to the various combinations of electromagnetic signals 150 and periods of time. Based on the determined duration of time the electromagnetic signal 150 is detected, the signal processor 635 can identify data corresponding to a combination of that electromagnetic signal 150 and a period of time that includes the detected duration of time.

At step 1106, the signal processor 635 can output the identified data, for example to the pen device application 670 of FIG. 6. As noted, the panel driver 665 (FIG. 6) can include computer program code that receives the data from the signal processor 635 and communicates the data to the pen device application 670 executed by the processor 605.

Figure 12:
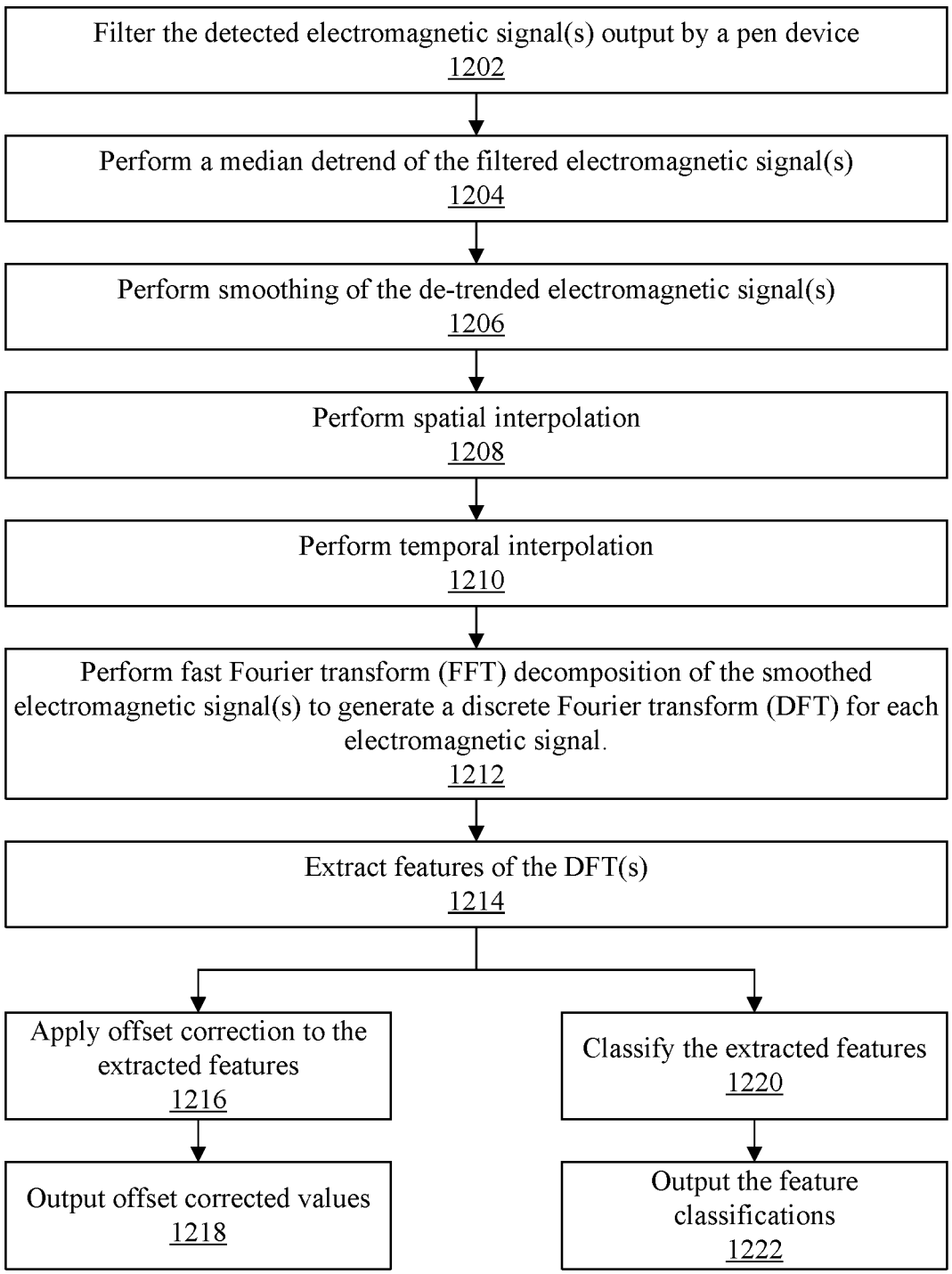
FIG. 12 is flow chart illustrating an example of a method processing detected electromagnetic signals output by a pen device.

FIG. 12 is flow chart illustrating an example of a method 1200 of processing detected electromagnetic signal(s) 150 output by a pen device. The method 1200 can be implemented by the signal processor 635 (FIG. 6) of the electronic device 140, for example at step 1004 of FIG. 10. The method 1200 can be continuously implemented while at least one electromagnetic signal 150 is detected by the electronic device 140.

At step 1202, the signal processor 635 can filter the detected electromagnetic signal(s) 150 output by a pen device 110. For example, the signal processor 635 can filter the detected electromagnetic signal(s) 150 to pass defined frequencies and reject other frequencies. The filters that are used to perform the filtering can include various types of filters and/or various quantities of filters. For example, different filters can be provide for different frequency ranges. The filtered electromagnetic signal(s) 150 can be stored in continuously updated circular buffers.

At step 1204, the signal processor 635 can perform a detrend of the filtered electromagnetic signal(s). For example, the signal processor 635 can remove a median trend that changes over time, for example within a threshold time period. The threshold time period can be, for example, 10 ms, 20 ms, 30 ms, 40 ms 50 ms, and so on. In other aspects, the detrend can include subtraction of a constant or a polynomial trend. Still, other forms of detrending can be used and the present arrangements are not limited in this regard.

At step 1206 the signal processor 635 can perform smoothing of the de-trended electromagnetic signal(s), for example using prior electromagnetic signal estimates. From the de-trended and smoothed electromagnetic signal(s), the signal processor 635 can determine refined estimates of a touch or hover position of the nib 118 on/over the panel 160 in Cartesian coordinates. For example, a vertical coordinate, ye, can be determined by the equation ye=arg max $\{V[y,t_i]\}$ and a horizontal coordinate, xe, can be determined by the equation xe=arg max $\{V[x,t_i]\}$, where V is a detected voltage of the electromagnetic signal 150 at time $t_i$, ye is a row electrode of a touch sensor panel and xe is a column electrode of the touch sensor panel. In other words, ye can be determined by determining the row electrode sensing the highest voltage and xe can be determined by determining the column electrode sensing the highest voltage. In this regard, the electrodes ye, xe exhibiting maximum voltage values among the rows ye and columns xe can be considered to be candidate preliminary estimates of position.

At step 1208, the signal processor 635 can perform spatial interpolation on the electromagnetic signal(s) to refine the determination of the position of the nib 118 on or above the touch sensor panel in Cartesian coordinates. For example, assume that two row electrodes positioned next to each other detect the highest voltages from among the voltages detected by the row electrodes. The signal processor 635 can interpolate the electromagnetic signal(s) to determine a vertical position $p_v$ of the nib 118, for example between the two row electrodes (e.g., $ye_1$ and $ye_2$), based on the values of the voltages sensed by those electrodes. Also, assume that two column electrodes (e.g., $xe_1$ and $xe_2$) positioned next to each other detect the highest voltages from among the voltages detected by the column electrodes. The signal processor 635 can interpolate electromagnetic signal(s) to determine a horizontal position $p_h$ of the nib 118, for example between the two column electrodes, based on the values of the voltages sensed by those electrodes.

At step 1210, the signal processor 635 can perform temporal interpolation on the electromagnetic signal(s) to refine further the determination of the vertical position $p_v$ and horizontal position $p_h$ of the nib 118 on or above the touch sensor panel. For example, based on successive measurements of the electromagnetic signal voltages (e.g., at times $t_1$ and $t_2$), the signal processor 635 can interpolate vertical and horizontal positions $p_v$, $p_h$ of the nib 118, in Cartesian coordinates, between the successive measurements.

At step 1212, the signal processor 635 can perform Fourier transform (FFT) decomposition of the smoothed electromagnetic signal(s) to generate a discrete Fourier transform (DFT) for each electromagnetic signal. Each DFT can be a frequency domain representation of the electromagnetic signal(s), which may be detected in the time domain. The FFT can be applied to the time histories of the detected voltages of the electromagnetic signal(s), for example, the voltages detected by the row and column electrodes ye, xe detecting the highest voltages.

At step 1214, the signal processor 635 can extract features of the DFT(s). The features can include, for example, the frequencies contained in the respective electromagnetic signals and the amplitude of the respective frequencies. For example, the signal processor 635 can compute single sided power spectra of the electromagnetic signal by applying Welch's method to the transformed data. Results of such computation can be processed to determine electromagnetic power (e.g., PSD) of the various frequencies. It should be noted that from time to time the electromagnetic signal 150 detected by the electronic device 140 may change due to the user depressing a button or providing another user input on the pen device 110. A change of the electromagnetic signal 150 can be determined responsive to determining one or more changes in frequency and/or amplitude exceeding a threshold value.

In illustration, a press of a particular button can be determined if values of PSDs at bins corresponding to associated frequencies (e.g. $f_i$, $f_j$, $f_k$) are countably exceeding threshold values, e.g. n1 in a classifier. A preprogrammed decision tree, for instance, can be used for mode switching. A user interface rendering effect can be selected for a momentary press of a button, a long press of the button if presses are detected for samples N1>n1, or a detected pattern in tracked coordinates of the position of the pen. For example, patterned movement of the pen can be determined using computationally time efficient methods, such as the 1$ algorithm for geometric template matching, which is known to those of ordinary skill in the art.

At step 1216, the signal processor 635 can apply offset correction to the extracted features. The offset correction can include additional processing of the estimated vertical and horizontal positions $p_v$, $p_h$ of the nib 118 determined at step 1210 to refine further the Cartesian coordinate positions, and output offset corrected Cartesian coordinate values, xe_corrected and ye_corrected. In illustration, the signal processor 635 can, based on the frequencies contained in the respective electromagnetic signals and the amplitude of the respective frequencies, apply one or more appropriate correction functions, for example pre-calibration techniques, to the vertical and horizontal positions $p_v$, $p_h$. The correction functions can map touch/hover estimates to encoder tracked positions where the pen device is in the same mode contacting or hovering over the touch sensor panel. At step 1218, the signal processor 635 can output offset corrected values, xe_corrected and ye_corrected. Use of the offset corrected values can lower jitter in the determined vertical and horizontal positions $p_v$, $p_h$, thus providing smoother (e.g., more linear) tracking of the nib 118 of the pen device 110.

At step 1220, the signal processor 635 can classify the extracted features. For example, in the case of detecting a touch or hover e.g., no-touch condition, the detected features can be compared to retained baseline values corresponding to the "no-touch" condition. A change in electromagnetic signal values (e.g., PSDs) being greater than a threshold value can indicate a touch event. Otherwise, the electromagnetic signal can be assumed to be a baseline value for a "no-touch" condition. Other methods of classification may be used, for example method of classification using logic, machine learning, search trees, etc.

At step 1222, the signal processor 635 can output the extracted feature classifications. The feature classifications can indicate user interface effects or other processes to be implemented by the pen device application 670 in response to the detected electromagnetic signal(s) 150.

In sum, Spectral analysis can be used to obtain statistical features of the electromagnetic signals, such as the root mean square variation of power in a number of frequency bands, Quality (Q) factor, distributional statistics (e.g. variance, mean, etc.), measures of temporal variation, and the number of successive observations of each feature's value lying within a certain range. Features all can be tracked and used to render user interaction effects and/or other processes. The user interaction effects/processes that can be achieved can depend on the application. Arrangements for purposes such as mode switching, determining whether there are long presses on buttons, and other use cases are described respect to the following figures.

In further aspects of the present arrangements, the method 1200 can include variations incorporating other features of the electromagnetic signal(s) 150, for example amplitude, phase, statistical parameters, etc. Moreover, the method 1200 can include variations incorporating the decomposition of the electromagnetic signal(s) 150 using other techniques, for example correlation, curve fitting, discrete cosine transform, empirical mode decomposition, wavelets, etc. Variations on the present arrangements also can integrate sensing of other physical parameters for enabling further contextualization of interactions with various subcomponents of the electronic device 140, or other electronic devices, other than those using touch screen panels.

Figure 13:
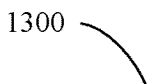
FIG. 13 depicts a table of use cases in which a pen device may be used.

FIG. 13 depicts a table 1300 of use cases in which the pen device 110 may be used. In the example use cases, feature classifications that are output by the signal processor 635 (FIG. 6) of the electronic device 140 can be processed by the pen device application 670 (FIG. 6) to implement various processes. In this regard, the pen device application 670 can be configured to interface with the operating system 660 (FIG. 6) and various different applications 675 (FIG. 6) to initiate processes performed by the operating system 660 and the applications 675. In illustration, if the signal processor 635 processes a certain electromagnetic signal output by the pen device 110 resulting from various button selections by the user, and generate corresponding feature classifications. The pen device application 670 can initiate processes based on which application 675 currently has focus in the user interface of the electronic device 140, or based on whether a view presented by the operating system 660 has focus.

By way of example, in response to the user depressing the button 230 (e.g., a grip button), the corresponding feature classification output from the signal processor 635 that results from processing that electromagnetic signal can received by the pen device application 670. Such process can include, regardless of which application 675 or operating system view currently is active in the user interface of the electronic device 140, initiating a process to provide access to an action menu. For instance, responsive to the user depressing the button 230, the pen device application 670 can cause the action menu to be presented to the user in the user interface presented on the panel 160.

In another example, if a browser (e.g., web browser) is open and is a currently active application (i.e., has focus) on the panel 160, and the nib 118 is touching the panel 160 where content is presented by the browser, depression of the button 220 (e.g., depression of the nib 118) can initiate a process of performing a copy operation, or depression of the button 210 (e.g., by click member 114) can initiate a process of performing a search about content presented by the browser. In another example, if a browser is open and is a currently active application on the panel 160, and the nib 118 is hovering over the panel 160 over a bar or input field of the browser, depression of the button 220 can initiate a process of performing a paste operation to paste copied or cut content, or depression of the button 210 can initiate a process of navigating the browser back to a last uniform resource locator (URL) that was accessed by the browser (e.g., go back to last URL).

In another example, if a map application is open and is a currently active application presented on the panel 160, depression of the button 220 can initiate a process of performing a zoom on a portion of a map presented by the map application where the nib 118 is touching or hovering, or depression of the button 210 can initiate a process of pinning a location at a on a portion of a map presented by the map application where the nib 118 is touching or hovering. In another example, if a media playback application is open and is a currently active application presented on the panel 160, depression of the button 220 can initiate a process of toggling or pausing media playback, or depression of the button 210 can initiate a process of skipping to a next media content from current media content. In another example, if a drawing application is open and is a currently active application presented on the panel 160, depression of the button 220 can initiate a process of quickly advancing to a next drawing mode, or depression of the button 210 can initiate a process of accessing a drawing tool menu. In another example, if an electronic messaging application is open and is a currently active application presented on the panel 160, depression of the button 220 can initiate a process of toggling between copy and paste, or depression of the button 210 can initiate a process of accessing a list of contacts of the user.

In another example, if a home/apps icon is presented by the operating system 660 on the panel 160, and the nib 118 is touching or hovering over the home/apps icon, depression of the button 210 can initiate a process of accessing quick actions (e.g., initiate an action without requiring a menu to be accessed). Further, via one or menus of the pen device application 670, a user can define custom settings for initiating processes to be initiated in response to the user depressing the button 220 if the home/apps icon or a home/apps screen is presented on the panel 160 by the operating system 660, or in response to the user depressing the button 210 if the home/apps screen is presented. Moreover, via one or menus of the pen device application 670, the user can customize the pen device application 670 to assign different processes to combinations of button inputs and applications/operating system. Also, the present arrangements are not limited to the buttons 210, 220, 230 depicted in table 1300. The pen device 110, for example, can include one or more buttons, and processes can be specified for user depression of such buttons, depending on which application (or operating system view) is active and currently has focus when a button is depressed.

Some functions such as instant action menu pullup can be generically useful, but others can be supported for specific use cases. With a map active on the panel 160 of the electronic device 140, for instance, engaging the button 210 of the pen device 110 can assign tapped locations to favorites lists, while a press on the button 220 (e.g., press of the nib 118) can enable zooming. Compression of the button 230 on the grip 116 can enable access to an action menu (e.g., the menu 1700 of FIG. 17). Pinning and zooming may not necessarily be relevant in other use cases, so different functions can be assigned to interactions with the same user interface elements (e.g., buttons, etc.) of the pen device 110. For example, a press on the button 220 (e.g., press of the nib 118) can toggle between play/pause during media playback while the button 210 can be used to skip to play next media content.

FIGS. 14A and 14B depict views 1400, 1450 presented by a panel 160 of an electronic device 140 representing another example of a use case in accordance with the present arrangements. In this example, a camera application 1405 can be open and a user interface 1410 of the camera application 1405 can be presented on the panel 160 of the electronic device 140. The user interface 1410 can present a plurality of images, including an image 1415. Referring to FIG. 14A, using the pen device 110, a user can select (e.g., depress) one buttons on the pen device 110. In response, the electromagnetic signal 150 (FIG. 1) output by the pen device 110 can change based on the button(s) that is/are depressed, and the electronic device 140 (e.g., the panel 160) can detect the new electromagnetic signal. In this example, in response to the electronic device 140 detecting the new electromagnetic signal, based on the frequencies contained in the new electromagnetic signal, the pen device application 670 (FIG. 6) can initiate launch of an electronic messaging application 1420 (e.g., a text message application or an instant messaging application).

Responsive to launching the electronic messaging application 1420, the pen device application 670 can interface with the operating system 660 (FIG. 6) to present a user interface 1425 of the electronic messaging application 1420 on the panel 160, for example below the user interface 1410 of the camera application 1405. The user interface 1425 can present, for example, fields 1430, 1435 for composing an electronic message. The field 1430 can be a recipient field in which the user identifies a recipient of the electronic message. The field 1435 can be a message field in which the user composes the electronic message and/or adds content to the electronic message, for example by adding attachments and/or adding text to the field 1435.

Using the pen device 110, the user can insert the image 1415 into the electronic message, for example by performing copy and paste operations, or by performing a drag operation, to add the image to the message field 1435. The user can implement such operations by depressing one or more buttons on the pen device 110, which the pen device application 670 can detect, or the pen device application 670 can interpret the user's selection of the image 1415 based on the position of the nib 118 and the user's movement of the nib 118 to the field 1435, regardless of which buttons on the pen device 110 the user has pushed. For example, the pen device application 670 can detect the nib 118 contacting, or hovering over, a region of the panel 160 displaying the image 115 for a threshold period of time, and then detect the user moving the nib 118 to the field 1435.

FIG. 14B depicts the image 1415 having been copied/dragged into the message field 1435. The user can enter or select a user identifier in the recipient field 1430 to indicate a recipient of the electronic message and, optionally, enter text or other data into the message field 1435. The user can send the electronic message to the recipients indicated in the recipient field 1430 by selecting an icon 1455 or menu item using the pen device 110 or an appendage (e.g., a finger). Because the user has copied/dragged the image 1415 into the electronic message, the electronic message will include the image 1415.

FIGS. 15A and 15B depict views 1500, 1550 presented by a panel 160 of an electronic device 140 representing another example of a use case in accordance with the present arrangements. In this example, the panel 160 of the electronic device 140 can present a view 1500 of a user interface 1505 provided by the operating system 660 (FIG. 6). Referring to FIG. 15A, using the pen device 110, a user can select from the user interface 1505 an icon 1510 representing a telephony application. Based on the electromagnetic signal 150 (FIG. 1) output by the pen device 110, the pen device application 670 (FIG. 6) can determine the user has selected the icon 1510. For example, the pen device application 670 can detect the user selection based on an electromagnetic signal 150 matching predetermined frequencies being detected by the panel 160 at a location on the panel 160 where the icon 1510 is presented, or based on an electromagnetic signal 150 generated by the pen device 110 being detected by the panel 160 at a location on the panel 160 where the icon 1510 is presented for at least a threshold period of time.

Responsive to determining the user has selected the icon 1510, the pen device application 670 can interface with the telephony application to present telephony options in the user interface 1505, for example as depicted in the view 1550 depicted in FIG. 15B of the user interface 1505. The telephony options can include, for example, one or more options 1555, 1560 for selecting a particular contact of the user to whom a telephone call is to be initiated, and an option 1565 to select a keypad for the user to input a telephone number to call.

The present arrangements are not limited to this example. For instance, similar processes can be implemented to present to the user options for selecting particular contacts and/or entering user identifiers for electronic messages (e.g., e-mails, text messages, instant messages, etc.) the user may desire to send.

In another example, referring to FIG. 15A, similar processes can be implemented in response to the user selecting an icon 1515 using the pen device 110 to initiate a camera mode of operation for the electronic device 140. For example, responsive to detecting a first electromagnetic signal 150 output by the pen device 110, the pen device application 670 can interface with a camera application to launch the camera application and set the camera application to a first mode (e.g., a still image mode). Responsive to detecting a second electromagnetic signal 150 output by the pen device 110, the pen device application 670 can interface with a camera application to launch the camera application and set the camera application to a second mode (e.g., a video mode). Still, different electromagnetic signals 150 can be used to set other modes of the camera application, and the present arrangements are not limited in this regard.

Figures 16A, 16B:
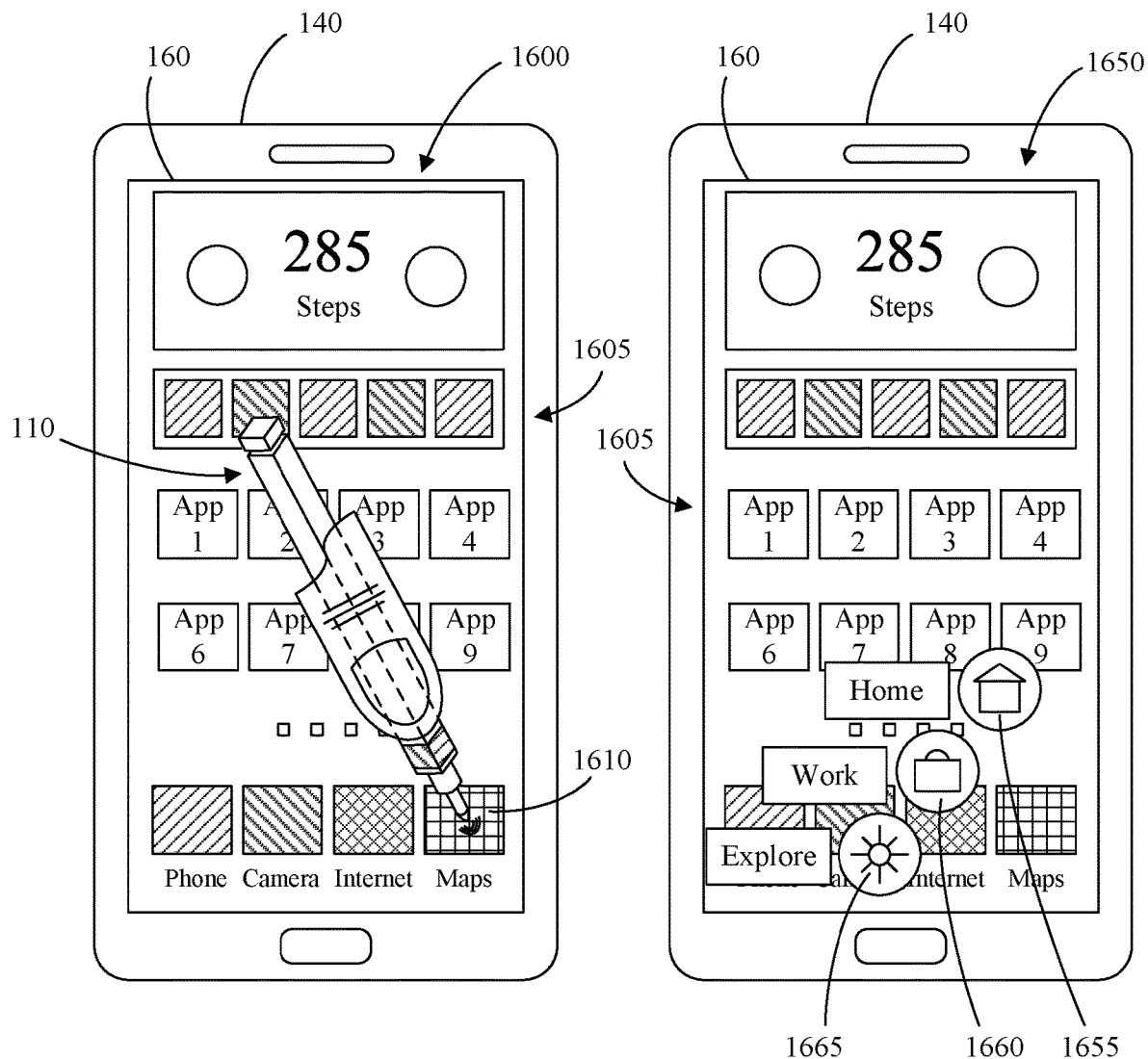
FIGS. 16A and 16B depict views presented by a panel of an electronic device representing another example of a use case in accordance with the present arrangements.

FIGS. 16A and 16B depict views 1600, 1650 presented by a panel 160 of an electronic device 140 representing another example of a use case in accordance with the present arrangements. In this example, the panel 160 can present a view 1600 of a user interface 1605 provided by the operating system 660 (FIG. 6). Referring to FIG. 16A, using the pen device 110, a user can select from the user interface 1605 an icon 1610 representing a map application. Based on the electromagnetic signal 150 (FIG. 1) output by the pen device 110, the pen device application 670 (FIG. 6) can determine the user has selected the icon 1610, for example as previously described with regard to selection of other icons.

Responsive to determining the user has selected the icon 1610, the pen device application 670 can interface with the map application to present map options in the user interface 1605, for example as depicted in the view 1650 depicted in FIG. 16B of the user interface 1605. The map options can include, for example, one or more options 1655, 1660 for selecting a particular geographic location to include as a starting point or destination of a map to be generated, and an option 1665 to explore mapping options.

The present arrangements are not limited to this example. For instance, similar processes can be implemented to present to the user options for selecting and/or entering particular parameters pertaining to desired mapping functionality.

Figure 17A:
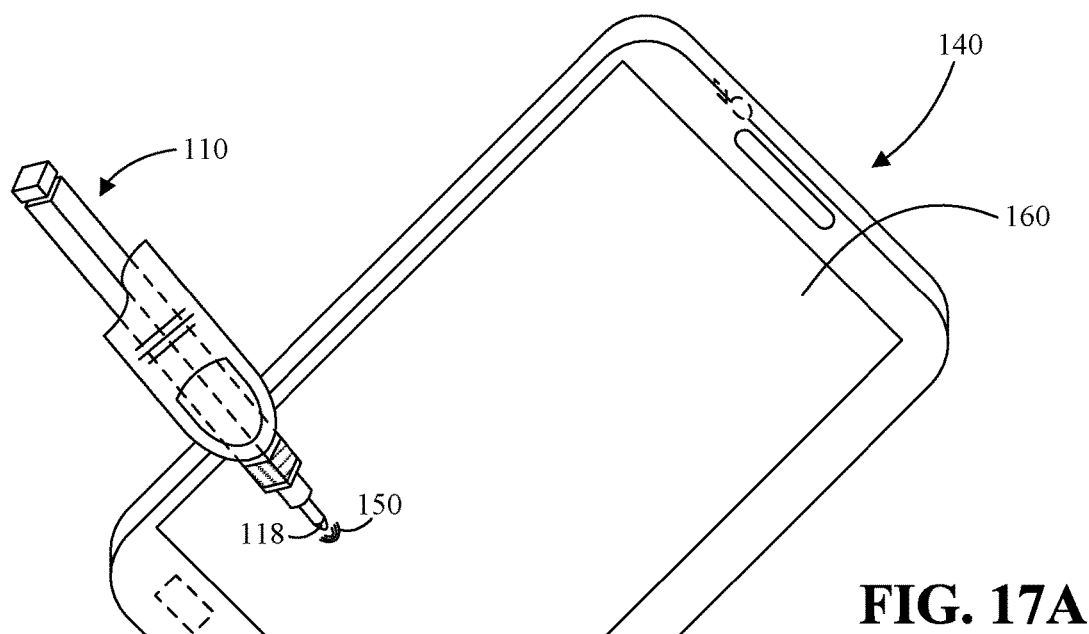
FIGS. 17A and 17B depict an example of an interaction of a pen device with an electronic device.
Figure 17B:
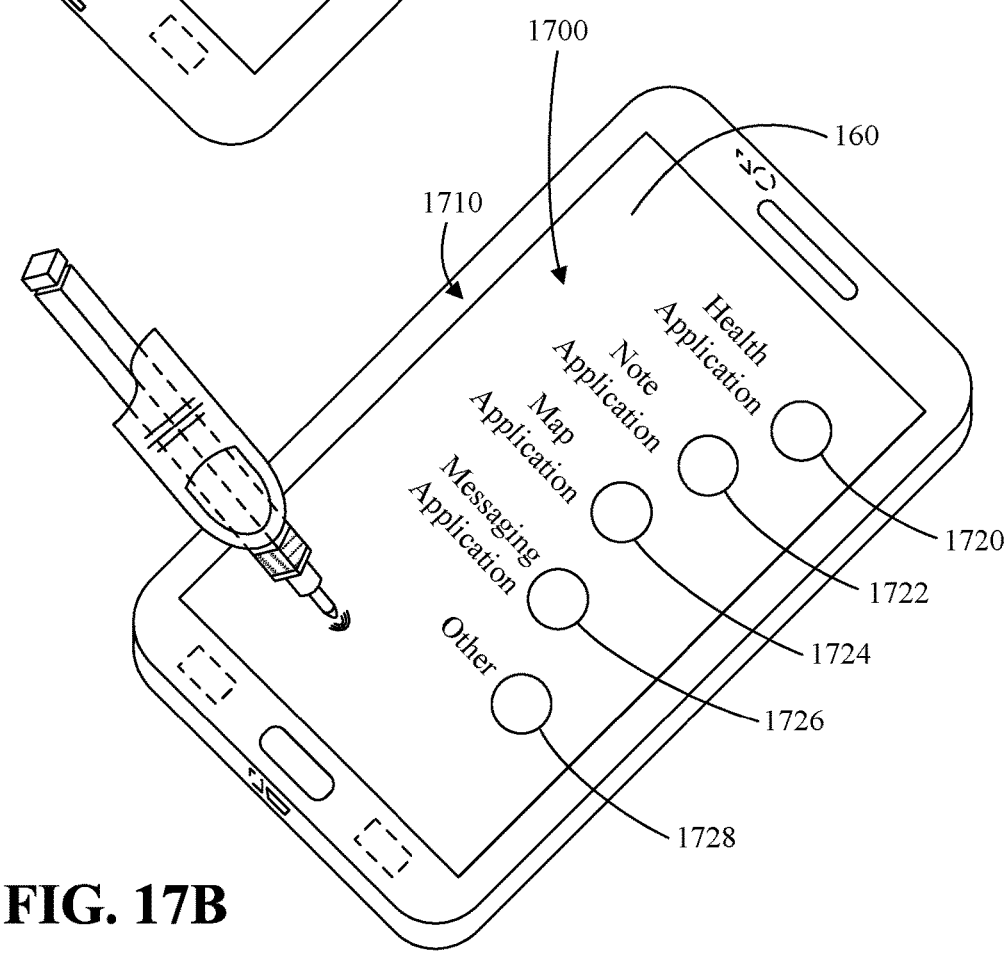

FIGS. 17A and 17B depict an example of an interaction of the pen device 110 with the electronic device 140. Referring to FIG. 17A, a user can place the nib 118 of the pen device 110 on, or hover the nib 118 over, the panel 160 of the electronic device 140. Responsive to detecting the electromagnetic signal 150 output by the nib via the panel 160, which may or may not be generated in response to the user depressing a button of the pen device 110 (e.g. buttons 210, 220, 230, 232 shown in FIG. 2), the pen device application 670 (FIG. 6) can initiate the operating system 660 (FIG. 6) to present a menu 1700 (e.g., an action menu) in a user interface 1710 of the operating system 660 presented on the panel 160, an example of which is depicted in FIG. 17B. For example, the menu 1700 can be presented in response to the electronic device 140 detecting any electromagnetic signal 150 output by the nib while the operating system 660 is in a particular state, or in response to the electronic device 140 detecting a particular electromagnetic signal 150 output by the nib while the operating system 660 is in a particular state. The menu 1700 can, for example, present various applications 1720, 1722, 1724, 1726 and/or other processes 1728 the user may initiate via the menu 1700. If the user selects the other processes 1728, the pen device application 670 can present another menu of applications/processes from which the user can select an application/process to initiate. The present arrangements, however, are not limited to these examples and detection of the electromagnetic signals via the panel 160 can be processed by the electronic device 140 to implement any other processes.

Figures 18A, 18B:
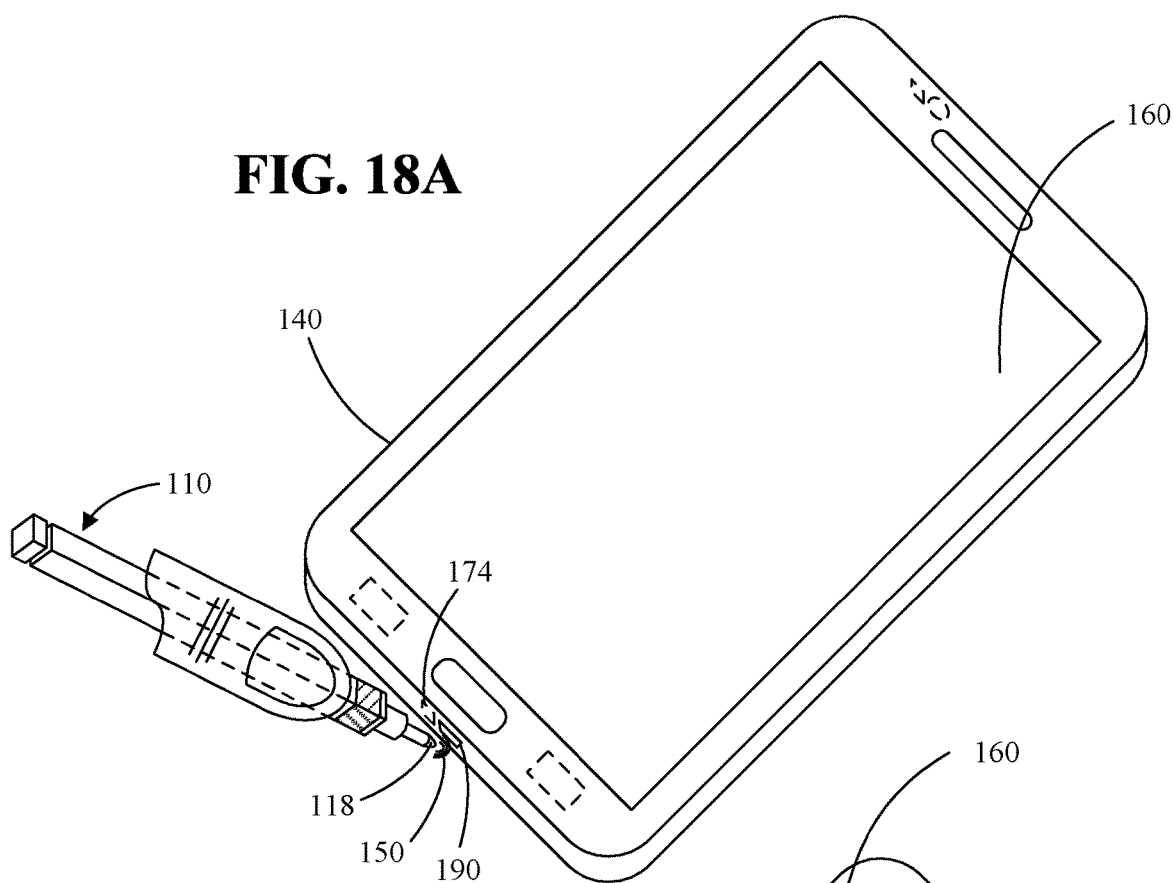
FIGS. 18A and 18B depict another example of an interaction of a pen device with an electronic device.

FIGS. 18A and 18B depict another example of an interaction of the pen device 110 with the electronic device 140. In this example, as shown in FIG. 18A, the pen device 110 can be used to communicate the electromagnetic signal 150, via the nib 118, to the communication port 190 (e.g., a USB port and/or charging receptacle) or the sensor 174 of the electronic device 140, which are external to the panel 160. Responsive to the electronic device 140 detecting the electromagnetic signal 150 via the communication port 190 or the sensor 174, the pen device application 670 can interface with the operating system 660 to present a menu option 1800, shown in FIG. 18B, on the panel 160 via a user interface 1810 of the operating system 660. The menu option 1800 can be user selectable to set power setting modes for the electronic device 140. Still, the menu option 1800 can be configured to set any other user configurable preferences and the present arrangements are not limited in this regard. Moreover, the present arrangements are not limited to these examples and detection of the electromagnetic signals by communication port 190 or the sensor 174 can be processed by the electronic device 140 to implement any other processes.

Figure 19A:
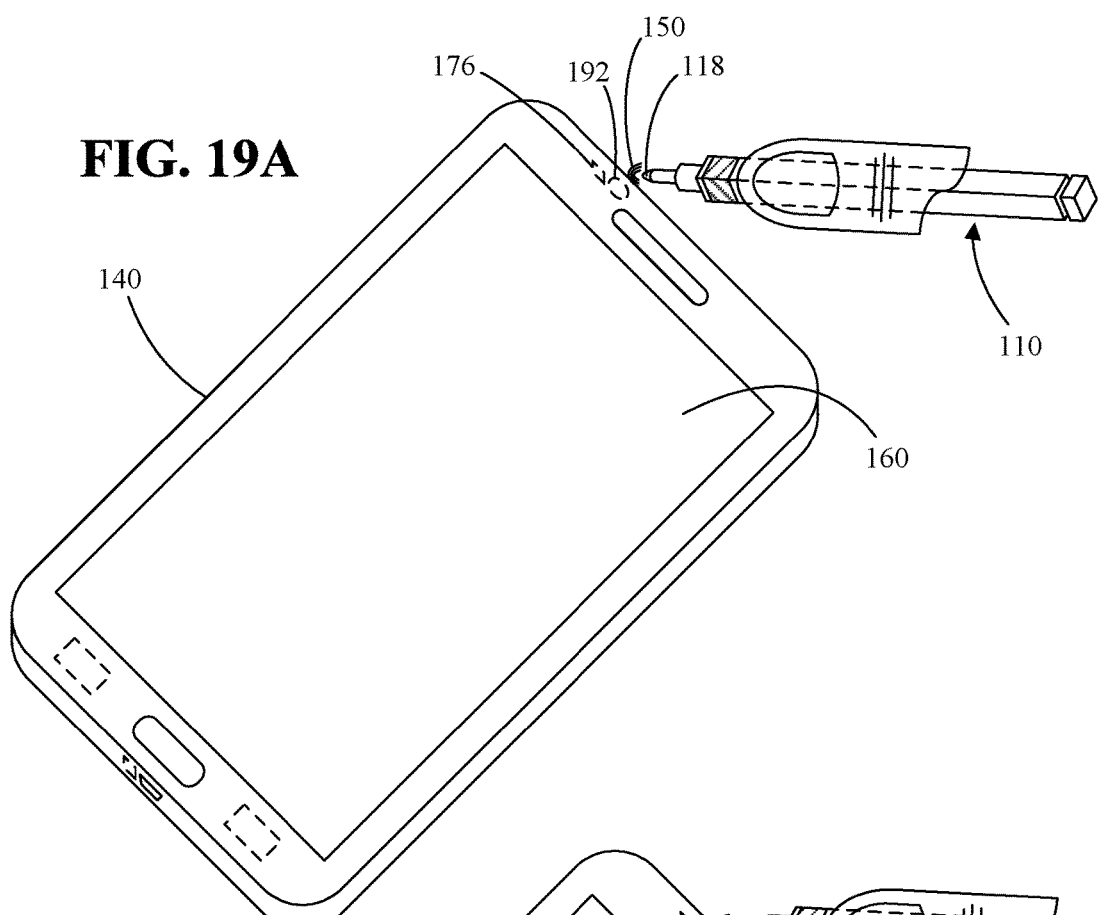
FIGS. 19A and 19B depict another example of an interaction of a pen device with an electronic device.
Figure 19B:
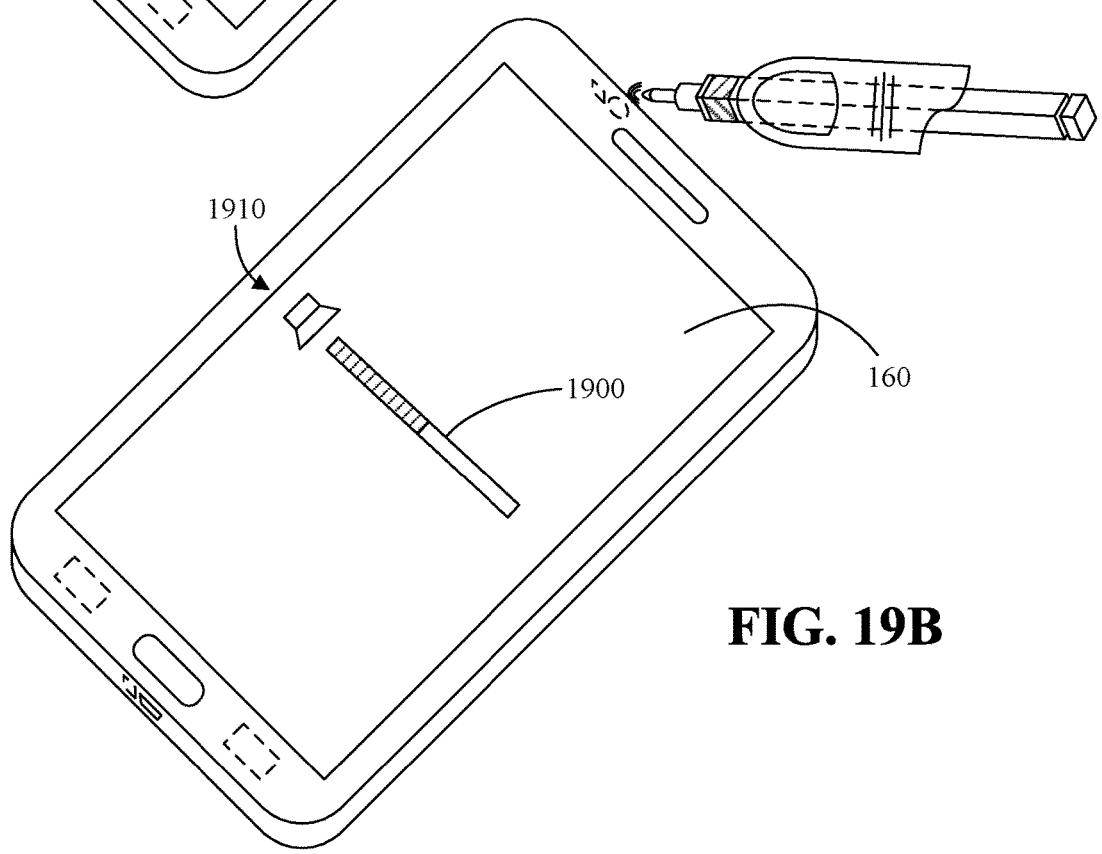

FIGS. 19A and 19B depict another example of an interaction of the pen device 110 with the electronic device 140. In this example, as shown in FIG. 19A, the pen device 110 can be used to communicate the electromagnetic signal 150, via the nib 118, to the audio port 192 of the electronic device 140 or the sensor 176, which are external to the panel 160. Responsive to the electronic device 140 detecting the electromagnetic signal 150 via the audio port 192 or the sensor 176, the pen device application 670 can interface with the operating system 660 to present a menu option 1900, shown in FIG. 19B, on the panel 160 via a user interface 1910 of the operating system 660. The menu option 1900 can be user selectable to set audio modes for the electronic device 140, for example an audio volume of audio signals output by an output audio transducer of the electronic device 140, or an output audio transducer communicatively linked to the electronic device 140, for example via the audio port 192 or a wireless communication link (e.g., a personal area network communication link). For instance, the menu option 1900 can be an audio volume control. Still, the menu option 1900 can be configured to set any other user configurable preferences and the present arrangements are not limited in this regard.

In another arrangement, responsive to the electronic device 140 detecting a first electromagnetic signal 150 via the audio port 192 (or the sensor 176), the pen device application 670 can interface with the operating system 660 to set a first audio mode for the electronic device 140, for example to increase an audio volume of the audio signals. Responsive to the electronic device 140 detecting a second electromagnetic signal 150 via the audio port 192 (or the sensor 176), the pen device application 670 can interface with the operating system 660 to set a second audio mode for the electronic device 140, for example to decrease an audio volume of the audio signals.

Figure 20A:
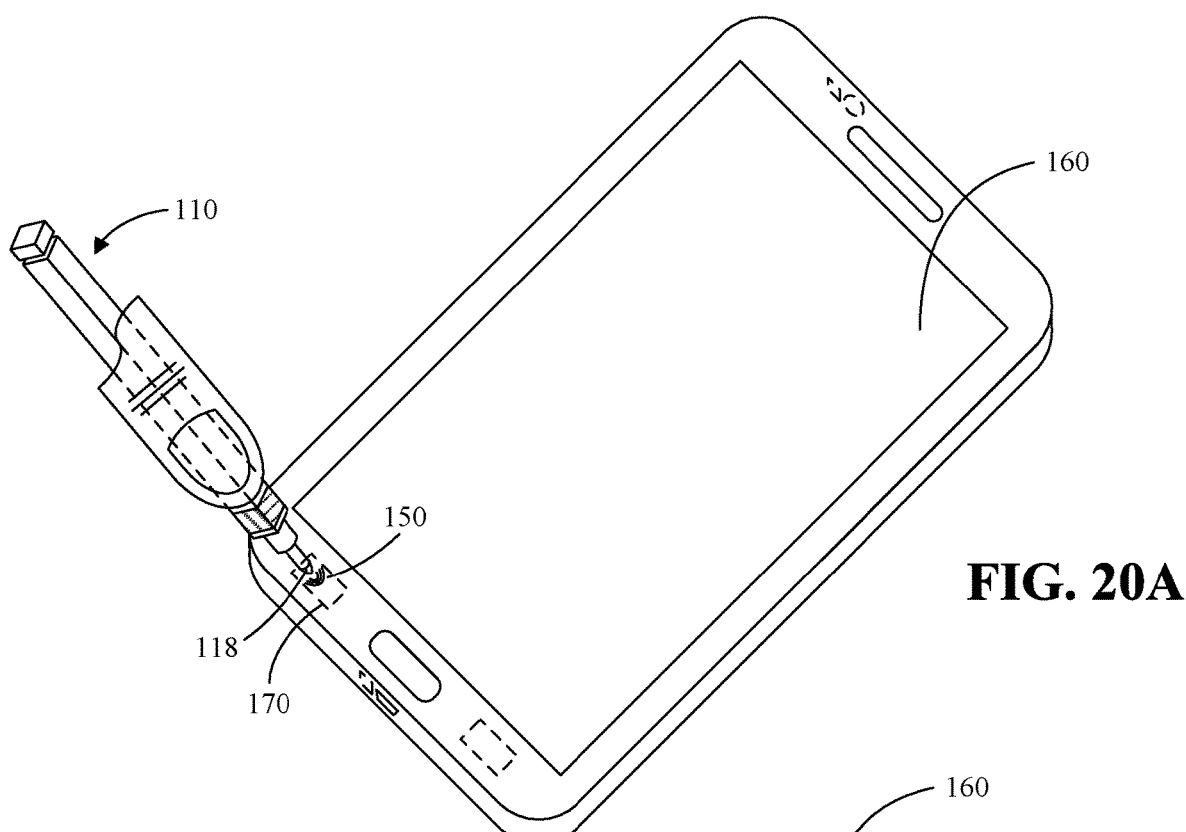
FIGS. 20A and 20B depict another example of an interaction of a pen device with an electronic device.
Figure 20B:
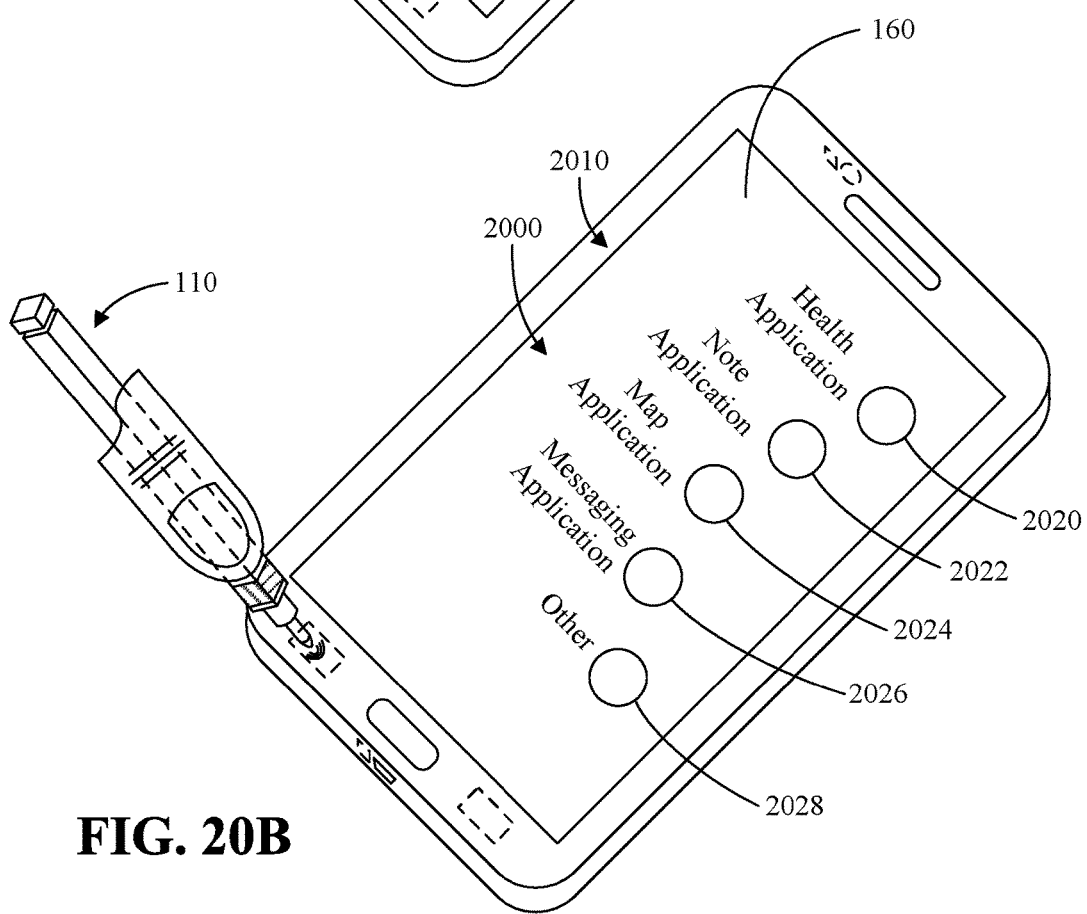

FIGS. 20A and 20B depict another example of an interaction of the pen device 110 with the electronic device 140. In this example, as shown in FIG. 20A, the pen device 110 can be used to communicate the electromagnetic signal 150, via the nib 118, to the sensor 170 of the electronic device 140, which is external to the panel 160. Responsive to the electronic device 140 detecting the electromagnetic signal 150 via the sensor 170, the pen device application 670 can interface with the operating system 660 to present a menu 2000, shown in FIG. 20B, on the panel 160 via a user interface 2010 of the operating system 660. The menu 1700 can present, for example, various applications 2020, 2022, 2026 and/or other processes 2028 the user may initiate via the menu 2000. If the user selects the other processes 2028, the pen device application 670 can present another menu of applications/processes from which the user can select an application/process to initiate.

In another arrangement, responsive to the electronic device 140 detecting the electromagnetic signal 150 via the sensor 170, the pen device application 670 can toggle between mode enabling controls provided by the user interface 2010. Still, the present arrangements are not limited to these examples and detection of the electromagnetic signals by the pen device 110 can be processed by the electronic device 140 to implement any other processes.

In addition to the various use cases described above, the present arrangements can integrate capabilities to sense other physical parameters. Sensing of such other physical parameters can be used to detect different devices with which the pen device 110 is interacting, and enabling different features for those device(s). Examples of the devices that may potentially be differentiated using the pen device 110 may include, for instance, a smartphones, a tablet computer, a laptop computer, and so on. Moreover, variations on the arrangements described herein, or communication between the device and the pen device 110, can be used for differentiating the device with which interactions occur. Further, arrangements described herein can support controls that depend on the detected device, device operating system(s), application(s), interface(s), peripheral connection (s), etc.

Alternative arrangements may support multiple device interactions. Multiple device interaction can be supported by leveraging preexisting connections on devices and/or through incorporation of a digital storage device (not shown) contained in the pen device 110. For example, copy and pasting experiences can be extended to scenarios involving multiple devices. When a file/object is copied, it can be communicated to the pen device 110 and stored in the digital storage device. When the file/object is pasted, it can be retrieved from the digital storage device and communicated by the pen device 110 to the device on which the paste operation is being performed. Signal generation methods can be used to relay request/transmit commands between the pen device 110 and other devices upon which data is accepted/released in signal encoded form to/from the digital storage device and/or across connections.

Additional arrangements may expand upon interaction possible through the hover disambiguation capabilities. For example, the detection of a pen device 110 hover can be invoked to render various effects. For instance, as noted, the detection of pen device 110 hover can be used to trigger a touch panel display to negate finger touch for users preferring to reduce undesirable effects of touch on a digital illustration or drawing. Still, various effects in addition to those described herein can be initiated.

The different electromagnetic signals 150 can be transmitted depending on the distance between a hovering pen and the panel 160. Signal decomposition and decoding methods or variations can be utilized to enable different context relevant processes, such as automatically switching among strokes in illustration applications or alternating between writing and navigation modes.

The terminology used herein is for the purpose of describing particular arrangements only and is not intended to be limiting. Notwithstanding, several definitions that apply throughout this document now will be presented.

As defined herein, the term "pen device" means an input device configured to be held in a hand of a user, includes at least one electrical circuit path and/or electronic circuitry, and is used by the user to enter user inputs directly onto a panel of an electronic device.

As defined herein, the term "nib" means an end part of a pen device configured to transmit electromagnetic signals to a panel and/or sensor.

As defined herein, the term "panel" means a component of, or communicatively linked to, an electronic device that is configured to receive user inputs at least via a pen device. A panel can be, for example, a touchscreen or a touchpad.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means communicating or transmitting to another component or system, or the like.

As defined herein, the term "passively output" means to output a received signal without processing the received signal using an integrated circuit or amplifying the received signal using an amplifier.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "user" means a human being.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the terms "one arrangement," "an arrangement," "one or more arrangements," or similar language mean that a particular feature, structure, or characteristic described in connection with the arrangement is included in at least one arrangement described within this disclosure. Thus, appearances of the phrases "in one arrangement," "in an arrangement," "in one or more arrangements" and similar language throughout this disclosure may, but do not necessarily, all refer to the same arrangement.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for realizing a user input on a panel, comprising:
   detecting, by the panel, at least a first electromagnetic signal output by a pen device;
   responsive to detecting, by the panel, the first electromagnetic signal output by the pen device, initiating at least a first user gesture interpretation process of a plurality of user gesture interpretation processes based on detecting the first electromagnetic signal output by the pen device;
   detecting, by a tactile sensor external to the panel, the first electromagnetic signal output by the pen device; and
   responsive to detecting, by the tactile sensor external to the panel, the first electromagnetic signal output by the pen device, initiating at least a second user gesture interpretation process specified to correspond to selection of the tactile sensor.

2. The method of claim 1, further comprising;
   identifying a plurality of frequencies contained in the first electromagnetic signal, the identified plurality of frequencies being at least a portion of a total of frequencies contained in the first electromagnetic signal; and
   determining a power spectral density of each of the identified plurality of frequencies contained in the first electromagnetic signal;
   wherein the first user gesture interpretation process is determined based on identifying the power spectral density of each of the identified plurality of frequencies contained in the first electromagnetic signal.

3. The method of claim 1, wherein the first electromagnetic signal for which detection initiates the first user gesture interpretation process and the second user gesture interpretation process is an electromagnetic noise signal received by a body of a user, detected by the pen device through an appendage of the user, and passively output by the pen device.

4. The method of claim 1, wherein the first electromagnetic signal for which detection initiates the first user gesture interpretation process and the second user gesture interpretation process is an electromagnetic noise signal received by a body of a user, detected by the pen device through an appendage of the user, and output by an electromagnetic signal generator of the pen device.

5. The method of claim 1, further comprising:
   detecting, by a communication port external to the panel, the first electromagnetic signal output by the pen device; and
   responsive to detecting, by the communication port external to the panel, the first electromagnetic signal output by the pen device, initiating at least a third user gesture interpretation process specified to correspond to selection of the communication port.

6. The method of claim 1, further comprising:
   detecting, by the panel, a second electromagnetic signal output by the pen device, the second electromagnetic signal including at least one frequency contained in the first electromagnetic signal and at least one frequency not contained in the first electromagnetic signal;
   identifying in the second electromagnetic signal the at least one frequency contained in the first electromagnetic signal and the at least one frequency not contained in the first electromagnetic signal; and
   responsive to identifying in the second electromagnetic signal the at least one frequency contained in the first electromagnetic signal and the at least one frequency not contained in the first electromagnetic signal, initiating at least a third user gesture interpretation process based on detecting the second electromagnetic signal output by the pen device.

7. The method of claim 1, further comprising:
   detecting, by an audio port external to the panel, the first electromagnetic signal output by the pen device; and
   responsive to detecting, by the audio port external to the panel, the first electromagnetic signal output by the pen device, initiating at least a third user gesture interpretation process specified to correspond to selection of the audio port.

8. A method of outputting at least a first electromagnetic signal by a pen device, comprising:
   outputting at least a first electromagnetic signal by the pen device, wherein detection of the first electromagnetic signal by a panel causes initiation of a first user gesture interpretation process of a plurality of user gesture interpretation processes at a device and detection of the first electromagnetic signal by a tactile sensor external to the panel causes initiation of a second user gesture interpretation process at the device.

9. The method of claim 8, further comprising:
   detecting, by the pen device via an appendage of a user, at least one electromagnetic noise signal external to the pen device;
   wherein the pen device passively outputs the electromagnetic noise signal as the first electromagnetic signal that initiates the first user gesture interpretation process and the second user gesture interpretation process at the device.

10. The method of claim 8, further comprising:
    detecting, by the pen device via an appendage of a user, at least one electromagnetic noise signal external to the pen device;
    wherein the pen device outputs the electromagnetic noise signal using an electromagnetic signal generator of the pen device that initiates the first user gesture interpretation process and the second user gesture interpretation process at the device.

11. The method of claim 8, further comprising:
    outputting at least a second electromagnetic signal, the second electromagnetic signal including at least one frequency not contained in the first electromagnetic signal and causes initiation of a second user gesture interpretation process at the device.

12. The method of claim 8, further comprising:
    receiving at least one user input by the pen device; and
    responsive to receiving the at least one user input, outputting a second electromagnetic signal, the second electromagnetic signal including at least one frequency contained in the first electromagnetic signal and at least one frequency not contained in the first electromagnetic signal.

13. An apparatus, comprising:
a memory configured to store instructions; and
a processor coupled to the memory, wherein the processor, in response to executing the instructions, is configured to initiate operations for realizing a user input on a panel including:
detecting, by the panel, at least a first electromagnetic signal output by a pen device;
responsive to detecting, by the panel, the first electromagnetic signal output by the pen device, initiating at least a first user gesture interpretation process of a plurality of user gesture interpretation processes based on detecting the first electromagnetic signal output by the pen device;
detecting, by a tactile sensor external to the panel, the first electromagnetic signal output by the pen device; and
responsive to detecting, by the tactile sensor external to the panel, the first electromagnetic signal output by the pen device, initiating at least a second user gesture interpretation process specified to correspond to selection of the tactile sensor.

14. The apparatus of claim 13, the operations further comprising;
identifying a plurality of frequencies contained in the first electromagnetic signal, the identified plurality of frequencies being at least a portion of a total of frequencies contained in the first electromagnetic signal; and
determining a power spectral density of each of the identified plurality of frequencies contained in the first electromagnetic signal;
wherein the first user gesture interpretation process is determined based on identifying the power spectral density of each of the identified plurality of frequencies contained in the first electromagnetic signal.

15. The apparatus of claim 13, wherein the first electromagnetic signal for which detection initiates the first user gesture interpretation process and the second user gesture interpretation process is an electromagnetic noise signal received by a body of a user, detected by the pen device through an appendage of the user, and passively output by the pen device.

16. The apparatus of claim 13, wherein the first electromagnetic signal for which detection initiates the first user gesture interpretation process and the second user gesture interpretation process is an electromagnetic noise signal received by a body of a user, detected by the pen device through an appendage of the user, and output by an electromagnetic signal generator of the pen device.

17. The apparatus of claim 13, the operations further comprising:
detecting, by a communication port external to the panel, the first electromagnetic signal output by the pen device; and
responsive to detecting, by the communication port external to the panel, the first electromagnetic signal output by the pen device, initiating at least a third user gesture interpretation process specified to correspond to selection of the communication port.

18. The apparatus of claim 13, the operations further comprising:
detecting, by the panel, a second electromagnetic signal output by the pen device, the second electromagnetic signal including at least one frequency contained in the first electromagnetic signal and at least one frequency not contained in the first electromagnetic signal;
identifying in the second electromagnetic signal the at least one frequency contained in the first electromagnetic signal and the at least one frequency not contained in the first electromagnetic signal; and
responsive to identifying in the second electromagnetic signal the at least one frequency contained in the first electromagnetic signal and the at least one frequency not contained in the first electromagnetic signal, initiating at least a third user gesture interpretation process based on detecting the second electromagnetic signal output by the pen device.

19. The apparatus of claim 13, the operations further comprising:
detecting, by an audio port external to the panel, the first electromagnetic signal output by the pen device; and
responsive to detecting, by the audio port external to the panel, the first electromagnetic signal output by the pen device, initiating at least a third user gesture interpretation process specified to correspond to selection of the audio port.

20. A pen device, comprising:
at least one component that outputs at least a first electromagnetic signal by the pen device, wherein detection of the first electromagnetic signal by a panel causes initiation of a first user gesture interpretation process of a plurality of user gesture interpretation processes at a device and detection of the first electromagnetic signal by a tactile sensor external to the panel causes initiation of a second user gesture interpretation process at the device.

21. The pen device of claim 20, wherein:
the pen device detects, via an appendage of a user, at least one electromagnetic noise signal external to the pen device; and
the pen device passively outputs, via the component, the electromagnetic noise signal as the first electromagnetic signal that initiates the first user gesture interpretation process and the second user gesture interpretation process at the device.

22. The pen device of claim 20, further comprising:
an electromagnetic signal generator configured to generate the first electromagnetic signal that initiates the first user gesture interpretation process and the second user gesture interpretation process at the device.

23. The pen device of claim 20, further comprising:
an electromagnetic signal generator configured to output at least a second electromagnetic signal that initiates a second user gesture interpretation process at the device, the second electromagnetic signal including at least one frequency contained in the first electromagnetic signal and at least one frequency not contained in the first electromagnetic signal.

24. The pen device of claim 20, further comprising:
an electromagnetic signal generator configured to receive at least one user input and, responsive to receiving the at least one user input, output a second electromagnetic signal that initiates a second user gesture interpretation process at the device, the second electromagnetic signal including at least one frequency contained in the first electromagnetic signal and at least one frequency not contained in the first electromagnetic signal.

25. A computer program product comprising a computer readable storage medium having program code stored thereon for realizing a user input on a panel, the program code executable by a processor to perform operations comprising:
detecting, by the panel, at least a first electromagnetic signal output by a pen device;

responsive to detecting, by the panel, the first electromagnetic signal output by the pen device, initiating at least a first user gesture interpretation process of a plurality of user gesture interpretation processes based on detecting the first electromagnetic signal output by the pen device;

detecting, by a tactile sensor external to the panel, the first electromagnetic signal output by the pen device; and responsive to detecting, by the tactile sensor external to the panel, the first electromagnetic signal output by the pen device, initiating at least a second user gesture interpretation process specified to correspond to selection of the tactile sensor.

26. The computer program product of claim 25, wherein the program code is executable by the processor to perform operations further comprising:

identifying a plurality of frequencies contained in the first electromagnetic signal, the identified plurality of frequencies being at least a portion of a total of frequencies contained in the first electromagnetic signal; and determining a power spectral density of each of the identified plurality of frequencies contained in the first electromagnetic signal;

wherein the first user gesture interpretation process is determined based on identifying the power spectral density of each of the identified plurality of frequencies contained in the first electromagnetic signal.

27. The computer program product of claim 25, wherein the first electromagnetic signal for which detection initiates the first user gesture interpretation process and the second user gesture interpretation process is an electromagnetic noise signal received by a body of a user, detected by the pen device through an appendage of the user, and passively output by the pen device.

28. The computer program product of claim 25, wherein the first electromagnetic signal for which detection initiates the first user gesture interpretation process and the second user gesture interpretation process is an electromagnetic noise signal detected by the pen device and output by an electromagnetic signal generator of the pen device.

29. The computer program product of claim 25, wherein the program code is executable by the processor to perform operations further comprising:

detecting, by a communication port external to the panel, the first electromagnetic signal output by the pen device; and responsive to detecting, by the communication port external to the panel, the first electromagnetic signal output by the pen device, initiating at least a third user gesture interpretation process specified to correspond to selection of the communication port.

30. The computer program product of claim 25, wherein the program code is executable by the processor to perform operations further comprising:

detecting, by the panel, a second electromagnetic signal output by the pen device, the second electromagnetic signal including at least one frequency contained in the first electromagnetic signal and at least one frequency not contained in the first electromagnetic signal;

identifying in the second electromagnetic signal the at least one frequency contained in the first electromagnetic signal and the at least one frequency not contained in the first electromagnetic signal; and responsive to identifying in the second electromagnetic signal the at least one frequency contained in the first electromagnetic signal and the at least one frequency not contained in the first electromagnetic signal, initiating at least a third user gesture interpretation process based on detecting the second electromagnetic signal output by the pen device.

31. The computer program product of claim 25, wherein the program code is executable by the processor to perform operations further comprising:

detecting, by an audio port external to the panel, the first electromagnetic signal output by the pen device; and responsive to detecting, by the audio port external to the panel, the first electromagnetic signal output by the pen device, initiating at least a third user gesture interpretation process specified to correspond to selection of the audio port.

* * * * *